US012652303B2

(12) United States Patent
Panasiuk et al.

(10) Patent No.: US 12,652,303 B2
(45) Date of Patent: Jun. 9, 2026

(54) MODULAR SYSTEM FOR AFFIRMING DIGITAL USER IDENTITY AND FRAUD RISK

(71) Applicant: Cheq AI Technologies (2018) Ltd., Tel Aviv (IL)

(72) Inventors: Robert Richard Panasiuk, Calgary (CA); Ari Jacoby, New York, NY (US)

(73) Assignee: Cheq AI Technologies (2018) Ltd., Tel Aviv (IL)

( * ) Notice: Subject to any disclaimer, the term of this patent is extended or adjusted under 35 U.S.C. 154(b) by 76 days.

(21) Appl. No.: 18/531,378

(22) Filed: Dec. 6, 2023

(65) Prior Publication Data

US 2024/0195828 A1     Jun. 13, 2024

Related U.S. Application Data

(60) Provisional application No. 63/387,067, filed on Dec. 12, 2022.

(51) Int. Cl.
| | |
|---|---|
| *H04L 9/40* | (2022.01) |
| *G06F 16/951* | (2019.01) |
| *G06F 21/55* | (2013.01) |
| *H04L 67/30* | (2022.01) |
| *H04L 67/50* | (2022.01) |

(52) U.S. Cl.
CPC ........ *H04L 63/1425* (2013.01); *G06F 16/951* (2019.01); *G06F 21/552* (2013.01); *H04L 67/30* (2013.01); *H04L 67/535* (2022.05)

(58) Field of Classification Search
CPC ... H04L 63/1425; H04L 67/30; H04L 67/535; G06F 16/951; G06F 21/552
See application file for complete search history.

(56) References Cited

U.S. PATENT DOCUMENTS

| | | | | |
|---|---|---|---|---|
| 10,904,277 | B1 * | 1/2021 | Sharifi Mehr | ...... H04L 63/1425 |
| 2002/0099649 | A1 * | 7/2002 | Lee | .................... G06Q 20/4016 |
| | | | | 705/38 |
| 2016/0203575 | A1 * | 7/2016 | Madhu | .................. H04W 12/12 |
| | | | | 705/319 |
| 2017/0286671 | A1 * | 10/2017 | Chari | .................... G06F 21/552 |
| 2019/0068627 | A1 * | 2/2019 | Thampy | .............. H04L 63/1425 |
| 2019/0068632 | A1 * | 2/2019 | Foster | ................. H04L 63/1433 |
| 2019/0363945 | A1 * | 11/2019 | Rogynskyy | .......... G06Q 10/107 |
| 2024/0046397 | A1 * | 2/2024 | McCurry | ............ G06F 21/6245 |

* cited by examiner

*Primary Examiner* — Abdulkader M Alriyashi
(74) *Attorney, Agent, or Firm* — Banner & Witcoff, Ltd.

(57) ABSTRACT

A method for detecting fraudulent activity on an online system might comprise acquiring data from online service providers about a plurality of interactions of users with the plurality of online service providers, building an identity profile of the user based on the data, receiving, from a client system, an API request, wherein the API request includes information about the user and a new user interaction apparently attempted by the user, comparing the information against the identity profile, and based on the comparing, generating an identity score for the new user interaction. If the identity score exceeds a threshold value, the method can comprise generating an alert, sending the alert to the user, receiving from the user an indication of whether the new user interaction was attempted by the user, and if the new user interaction was not attempted by the user, sending a report to the client system.

23 Claims, 18 Drawing Sheets

300

Identity Network: Activity Data

IDENTITY NETWORK: ENRICHMENT
700

Address Normalization

1600

1610 — Address Database

1620 — Processor

1630 — Address

1640

| | 123 Main St, New York, New York, 10001 | 123 Main St, New York, NY 10001 | 123 Main Street, New York, NY 10001, USA |
|---|---|---|---|
| address: number | 123 | 123 | 123 |
| address: street-1 | main | main | main |
| address: street-2 | | | |
| address: street_type | street | street | street |
| address: quadrant | | | |
| address: unit | | | |
| address: city | new york | new york | new york |
| address: state | ny | ny | ny |
| address: zip | 10001 | 10001 | 10001 |
| address: country | us | us | us |
| address: valid | false | | |
| ... | | | |

1650 — JSON Payload

FIG. 16

MODULAR SYSTEM FOR AFFIRMING DIGITAL USER IDENTITY AND FRAUD RISK

CROSS REFERENCE TO RELATED APPLICATIONS

This application claims the priority benefit under 35 U.S.C. § 119(e) of U.S. Provisional Patent Application No. 63/387,067, filed Dec. 12, 2022, hereby incorporated by reference in its entirety as though fully set forth herein.

FIELD

The subject matter described herein relates to a system for determining the trust or risk associated with an online user interaction based on digital data, the user's previous interactions, and without the need to verify of physical documents about the user's identity. This system has particular, but not exclusive, utility for improving user journeys and fraud prevention on websites and other online services.

BACKGROUND

A majority of customers for online goods and services feel that businesses have a corporate responsibility to protect their personal data. However, when users of online systems fall victim to e-mail scams, phishing websites, and domain spoofing, their identities can be compromised. When sensitive data is leaked online, bad actors may use this information to impersonate users, apply for credit, and create fraudulent accounts. Billions of credentials and identity records are compromised and distributed each year. Organized fraud rings use sophisticated techniques and automated scripts to test credential validity over a wide range of websites. Keeping users safe depends on being able to identify and deter a number of different attack types, including but not limited to credential stuffing (the testing of compromised credentials against target websites), account testing (the testing of accounts on a website to determine whether those users exist in the population), stolen and synthetic accounts (e.g., the creating of accounts partially related to a real identity for the purpose of committing fraud), and brute force (a targeted attack against a given account or individual where many different passwords are attempted). These activities can lead to financial and monetary loss, as well as the abuse of loyalty programs, misuse of services, and manipulation of online communities. Typical fraud tools focus on identifying risk using techniques to detect anomalies across a user's network, device, or behavioral interactions at a given moment in time. They are most effective at identifying bots and automated traffic but know little about the identity of users (e.g., real names, real addresses, or other identifying information). This is problematic, as people are often the weakest link in online security.

Accordingly, a long-felt need exists for improved online security systems that address the forgoing and other concerns.

The information included in this Background section of the specification, including any references cited herein and any description or discussion thereof, is included for technical reference purposes only and is not to be regarded as subject matter by which the scope of the disclosure is to be bound.

SUMMARY

Disclosed is an identity risk determination system that is advantageously configured to identify bad actors and malicious or unauthorized activity by providing high-fidelity risk-related data in one simple API response, which includes a risk score.

For purposes of the present application, the term "bad actors" shall be inclusive of, but not limited to, hackers, imposters, data thieves, identity thieves, spammers, scammers, phishers, vandals, spies, and other non-authorized users of an online platform or set of login credentials thereto. The term "application program interface" or API shall refer to a set of objects, commands, protocols, or functions that can be used by external software programs to interact with an online platform. For example, an API may provide external software, or the developers thereof, with standardized commands for performing operations on the online platform. The term "score" or "index" may refer to a single numerical quantity intended to express value, trustworthiness, or a probability that something has been compromised (e.g., a percentage, a value between 0 and 1, etc.), or may refer to a qualitative text or alphanumeric label indicating a level of risk or trustworthiness. The term "velocity" shall refer to the speed at which online interactions take place. For example, low velocity may be an indication that a user is human, whereas high velocity may indicate that the user is a bot, script, or other non-human device or system.

Depending on the implementation, the identity risk determination system of the present application may include (1) a data coalition, (2) a plurality of anonymous interaction profiles or behavior profiles, (3) a computational engine, (4) an identity risk index or identity score for each user event, (4) a notification and verification system, and (5) an intelligent reporting system.

The data coalition may include a plurality of member websites (e.g., 100,000 websites, 150,000 websites, 250,000 websites, etc.) or other online systems that collect information about the behavior of their users.

The anonymous interaction profiles or behavior profiles may for example store information about the behavior of a particular user across multiple websites or online services. Using a collection of behavioral and web analytics, the identity risk determination system builds profiles to understand their interactions across accounts, devices, networks, and locations, identifying bad actors and user impersonation. By building a longitudinal profile from billions of historical events, the identity risk determination system is able to compute probabilities (e.g., indices) that the user behind the screen is really who they claim to be. The system builds multi-dimensional identity profiles over time, to understand how users behave. Correlating networks, geo-locations, devices, and online activity all factor into creating a profile of a user's behavior.

The computational engine is a collection of models and algorithms that build derivative data and intelligence from the data coalition, and may be used for example to compute identity risk indices or risk scores. In some embodiments, the computational engine may include a client facing API that allows customers to query the identity risk determination system to evaluate the risk associated with a given online user interaction. The computational engine may then determine whether a particular interaction legitimately belongs to a given user account. The API then returns risk-related data, including a risk score.

The identity risk index or identity score is a combination of machine learning algorithms and statistical classifiers (e.g., calculated in real time) for each user event on a system, based on a comparison (e.g., by a deep learning network, anomaly detection, or other statistical or machine learning approaches) between one or multiple interaction profiles and the behavior of that user account. In an example, an identity risk score may return a numerical value between 0.0, indicating a very high probability that the interaction is legitimate, and 1.0, indicating a very high probability that the interaction is illegitimate. In another example, the identity risk score may be a string that includes a qualitative, human-readable categorization such as "TRUSTED", "NO_RISK", "LOW_RISK", "MED_RISK", "HIGH_RISK", etc. Depending on the implementation, still other risk scores or risk indices may be returned in the API response. The risk determination system also returns extensive aggregated data about the user's activity, device, network and geography, and may also return factors explaining the particular risk or trust factors for further consumption into other systems.

The identity score may for example augment existing fraud/risk management tools by providing a unique perspective into a specific user's behavior across billions of historical interactions. Given a wealth of telemetry data, discrepancies can be detected against a user's expected online activity to isolate fraud. For example, if a behavior within a particular user account resembles a behavior stored in profiles of compromised accounts (e.g., an account operated by a hacker using stolen credentials), then the identity risk score or index for that account or interaction may increase, whereas if the behavior within the user account resembles behavior seen in anonymous profiles of healthy or uncompromised accounts, then the identity score for interactions from that account may decrease or hold steady. The identity score may for example be available via a single API request, and can be used by merchants, businesses, and organizations to mitigate the risk of account compromise, for example by detecting activity in compromised accounts and alerting either or both of the user or the website provider. Early detection of compromised accounts may mitigate the damage caused by the intrusion, and may also deter hackers in the future by affecting their perceived chances of success.

In this way, the identity risk determination system may help reduce fraud and build user trust in online systems, by helping businesses make intelligent real-time identification of bad actors and suspicious behaviors while evaluating user interactions in the context of their activity across the web. Thus, the identity risk determination system can help build trust by enabling risk-based authentication for good users while keeping user accounts safe from compromise. The system may serve to protect users from multiple threat vectors, by identifying suspicious or malicious activity during different types or stages of account activity, including but not limited to new user registration, takeover of existing accounts, credential stuffing, account testing, scripting, phishing, website spoofing, social engineering, identity theft, and user impersonation. For example, the identity risk determination system can mitigate the threat of account takeover by identifying fraudulent login attempts based on user activity. Other suspicious activity may for example include accessing a service from a new device, from a new location, or from an unknown or spoofed location.

Changes in a user account's identity score, or an identity score for a particular interaction that exceeds a threshold value, may trigger an alert (e.g., a customer alert or an alert to website operators) through the notification and verification system. Such knowledge-based alerts may provide a comprehensive solution for protecting users, increasing conversion rates, and guarding against advanced attacks by notifying customers of suspicious activity before damage occurs. Similarly, by using customer alerts, businesses gain immediate first-party feedback whenever a user account is compromised, allowing for swift corrective action to reduce or eliminate loss and damage. The system may also trigger requests and/or notifications to other APIs or systems.

In this way, the identity risk determination system permits risk-based authentication, wherein returning trustworthy users, who expect convenience and consistency, are provided with a frictionless (e.g., quick and simple) login, whereas suspicious users may be subject to additional challenges (e.g., e-mail alerts, SMS alerts), account freezing, etc., which can not only increase security but also build user trust and improve user experiences, which can help online providers increase revenue. In general, it is believed that customers trust businesses with proactive cybersecurity. In the face of countless data breaches, customers are increasingly aware of how they share, store, and use their personal information to interact online.

The identity risk determination system can also aid in the positive verification of identity at enrollment, registration, account opening, credit card application, and online payment. Where an identity or user may be unknown to a particular entity or business, the risk determination system draws on data from a data coalition which may have exposure to billions of user interactions.

The identity risk determination system can also aid with legal compliance, and compliance with industry standards such as Service Organization Control 2 (SOC 2). Rapid detection of account breaches may reduce regulatory risk and exposure, as well as reducing actual damages, reputational damages, and fines. The identity risk determination system enables organizations to understand and monitor their security exposure in real time or near-real time. By detecting early signs of breach, organizations can react quickly to prevent damage and combat fraud in real time or near real time.

Depending on the implementation, the identity risk determination system may also include an intelligent reporting system that provides security insights to online service providers, and helps providers meet regulatory and SOC 2 monitoring and reporting requirements.

The identity risk determination system is configured to be integrable into a wide variety of business-to-customer (B2C), business-to-business (B2B), or business-to-business-to-customer (B2B2C) platforms where customer data or user data is exposed to potential compromise. Applications include but are not limited to e-commerce, education, mobile apps, travel, entertainment, banking and brokerage houses, cloud and infrastructure services, and corporate IT. The identity risk determination system can also be incorporated into authentication platforms such as Captcha, to drive two-factor authentication (2FA) or multi-factor authentication decisions.

Some embodiments include a computer-implemented method for detecting potentially fraudulent activity occurring over a networked computer system, the method comprising:

- a) providing a plurality of data objects, wherein a given data object of the plurality of data objects includes condition fields representing a plurality of conditions associated with the given data object;
- b) acquiring first data, from a plurality of online service provider systems;
- c) storing the first data within at least some data objects of the plurality of data objects, wherein the first data includes data relating to a plurality of interactions of a user with the plurality of online service provider systems;

d) acquiring second data, from the plurality of online service provider systems;

e) storing the second data within at least some data objects of the plurality of data objects, wherein the second data includes data relating to a second plurality of interactions of a plurality of other users other than the user;

f) generating at least three profiles selected from a behavioral profile, an activity profile, a device profile, a network profile, a geographical profile, and an identity profile of the user based on the first data or the second data, stored as a generated user identity graph;

g) receiving, from a client system, an application programming interface (API) request, wherein the API request includes information about the user and a new user interaction record associated with an interaction attempt of the user;

h) identifying matches between (1) the generated user identity graph and/or the information about the user from the API request and (2) the condition fields;

i) adding match fields to the given data object based on the matches identified to form a populated data object, wherein at least one match field includes data relating to the matches;

j) based on a plurality of populated data objects comprising the populated data object, determining (1) at least one trust signal response, (2) at least one information signal response, (3) at least one risk signal response, and (4) an identity risk score; and k) generating an API response, for sending to the client system in response to the new user interaction record, wherein the API response comprises a first representation of the identity risk score and a second representation of at least one of (1) the at least one trust signal response, (2) the at least one information signal response, and/or (3) the at least one risk signal response.

Some embodiments further comprise:

l) determining whether the identity risk score meets a predetermined criterion;

m) following a determination that the identity risk score meets the predetermined criterion:

1) generating a fraud check alert;

2) sending the fraud check alert to the client system;

3) receiving, from the client system, a fraud check response wherein the fraud check response indicates an indication from the user of whether a new user interaction represented by the new user interaction record was indeed attempted by the user; and 4) if the fraud check response indicates that the new user interaction was attempted by the user, denote the new user interaction as a legitimate user interaction; and 5) if the fraud check response indicates that the new user interaction was not attempted by the user, denote the new user interaction as an illegitimate user interaction and sending a fraud alert report to the client system.

Some embodiments further comprise:

6) based on whether the user interaction was attempted by the user, updating at least some data objects of the plurality of data objects.

Some embodiments further comprise performing steps h) and i) for each data object of the plurality of data objects, wherein the plurality of populated data objects comprise each data object having been populated in step i).

In some embodiments, the identity risk score comprises a numerical value.

In some embodiments, the numerical value ranges from 0, indicating a first indication, to 1, indicating a second indication, wherein the first indication represents a level of trust greater than that corresponding to the second indication.

In some embodiments, the identity risk score comprises an enumerated value selected from an enumerated list of {"TRUSTED", "NO_RISK", "LOW_RISK", "MEDIUM_RISK", "HIGH_RISK"}.

In some embodiments, the given data object is an e-mail activity response object associated with an e-mail address, and wherein the condition fields comprise at least one of (1) a date when the e-mail address was last seen, (2) a number of times the e-mail address has been seen, and/or (3) a number of IP addresses associated with the e-mail address.

In some embodiments, the given data object is an IP activity response object associated with an IP address, and wherein the condition fields comprise at least one of (1) a date when the IP address was last seen, (2) a number of times the IP address has been seen, and/or (3) a number of e-mail addresses associated with the IP address.

In some embodiments, wherein the given data object is an e-mail/IP response object associated with an e-mail address and an IP address, and wherein the condition fields comprise at least one of (1) an indication of whether the e-mail address and the IP address have been seen together before, (2) a date when the e-mail address and the IP address were last seen together, (3) a number of times the e-mail address and the IP address have been seen together, or (4) a ranking of the IP address against the e-mail address.

In some embodiments, wherein the given data object is a geographic response object associated with a geographic location of the user, and wherein the condition fields comprise at least one of (1) a detected jurisdiction within which a presence of the user is detected, and/or (2) detected geographic coordinates at which the presence of the user is detected.

In some embodiments, wherein the given data object is a network response object associated with a network of the user, and wherein the condition fields comprise at least one of (1) an ASN of an Internet Service Provider (ISP) that owns or controls systems that handle traffic for a user IP address of the user, (2) a name of the ISP, (3) a company registered to the user IP address, (4) a name of a virtual private network (VPN) service of the user, (5) a name of a crawler associated with the user IP address, and/or (6) an IP address characteristic indication the user IP address, wherein the IP address characteristic indication indicates one or more of (1) whether the user IP address is confirmed to be associated with a VPN, (2) whether the user IP address is suspected of being associated with a VPN, (3) whether the user IP address is capable of being used with a VPN, and/or (4) whether the user IP address is known to be associated with a tor network, a hosted network, a corporate network, a .edu network, a mobile network, and/or a proxy.

In some embodiments, the at least one trust signal response comprises at least one of a null indicator, a first indicator indicating that an e-mail address and IP address of the user are a match, a second indicator indicating that the IP address is familiar from past interactions with the user, a third indicator indicating that a network carrier of the user is familiar from past interactions with user, a fourth indicator indicating that a VPN is familiar from previous interactions, a fifth indicator indicating that a device of the user is familiar from past interactions with the user, a sixth indicator indicating that a country of the user is familiar from past interactions with the user, a seventh indicator indicating that a state of the user is familiar from past interactions with the user, an eighth indicator indicating that a city of the user is familiar from past interactions with the user, an ninth indicator indicating that a time zone of the user is familiar from past interactions with the user, a tenth indicator indicating that a time of day of the new user interaction is familiar from past interactions with the user, an eleventh indicator indicating that the user is interacting from a most common home location of the user, a twelfth indicator indicating that an entered address is within a threshold distance of a previously observed activity for a user, a thirteenth indicator indicating that two entered addresses are within the threshold distance of one another, a fourteenth indicator indicating that the activity observed for a user resembles a real human pattern.

In some embodiments, the at least one information signal response comprises at least one of a null indicator, a first indicator that infrequent activity has been observed for a user, a second indicator indicating that a device of the user is a mobile device, a third indicator indicating that the user is on a mobile network, a fourth indicator indicating that a user is on a corporate network, a fifth indicator indicating that the user is on an educational network, a sixth indicator indicating that the user is on a non-US network, a seventh indicator indicating that the user is on a commercial VPN, an eighth indicator indicating that the user has upgraded their device or app, an eighth indicator indicating that an IP address of the user has been seen fewer than a threshold number of times, a ninth indicator indicating that a network of the user has been seen less than a threshold number of times, a tenth indicator indicating that the user's device has been seen less than a threshold number of times, an eleventh indicator indicating that a country of the user has been seen less than a threshold number of times, a twelfth indicator indicating that a state of the user has been seen less than a threshold number of times, a thirteenth indicator indicating that a city of the user has been seen less than a threshold number of times, a fourteenth indicator indicating that a time zone of the user has been seen less than a threshold number of times, a fifteenth indicator indicating that activity observed for the user has a stable activity pattern, a sixteenth indicator indicating that the activity observed for the user resembles that of a frequent traveler.

In some embodiments, the at least one risk signal response comprises at least one of a null indicator, a first indicator indicating that an IP address of the user is new to the user, a second indicator indicating that a network of the user is new to the user, a third indicator indicating that a VPN of the user is new to the user, a fourth indicator indicating that a device of the user is new to the user, a fifth indicator indicating that a country of the user is new to the user, a sixth indicator indicating that a city of the user is new to the user, a seventh indicator indicating that a region of the user is new to the user, an eighth indicator indicating that the user is interacting from an unfamiliar time of day, a ninth indicator indicating that an age of an account of the user is less than a predetermined age, a tenth indicator indicating that an entered address is above a distance threshold of observed activity for a user, an eleventh indicator indicating that a distance between two entered addresses is above a distance threshold, a twelfth indicator indicating that the user is connecting through a rotating proxy, a thirteenth indicator indicating that the user is connecting through a public proxy, a fourteenth indicator indicating that the user is connecting through a hosted environment, a fifteenth indicator indicating that the user is a connecting through a TOR exit node, a sixteenth indicator indicating that the user is connecting through a private VPN, a seventeenth indicator indicating that the user is on a suspicious ISP, an eighteenth indicator indicating that the user has been detected to be a bot or crawler, a nineteenth indicator indicating that malware has been detected on the user's device or network, a twentieth indicator indicating that the user has downgraded their device or app, a twenty-first indicator indicating that it would be impossible for the user to interact from a previous location and a current location in an observed elapsed time, a twenty-second indicator indicating that the activity observed for the user resembles that of a script or bot, a twenty-third indicator indicating that network usage has been identified as anomalous, a twenty-fourth indicator indicating that a device usage has been identified as anomalous, a twenty-fifth indicator indicating that the user's city or state has been associated with recent anomalous activity, a twenty-sixth indicator indicating that a device of the user cycles over multiple accounts, a twenty-seventh indicator indicating that an account of the user cycles over multiple devices, a twenty-eighth indicator indicating that the account cycles over multiple IPs, a twenty-ninth indicator indicating that the account cycles over multiple addresses, thirtieth indicator indicating that an IP address of the user cycles over multiple emails or physical addresses, a thirty-first indicator indicating that the IP address has a spike of failed activity, a thirty-second indicator indicating that the account has a spike of failed activity, a thirty-third indicator indicating that the IP address has recently observed malicious activity, a thirty-fourth indicator indicating that a usage pattern of the device of the user has been identified as anomalous, a thirty-fifth indicator indicating an email tag or alias cycling, a thirty-sixth indicator indicating an invalid or undeliverable email address, a thirty-seventh indicator indicating a disposable email address, a thirty-eight indicator indicating a disposable domain, a thirty-ninth indicator indicating suspicious email formatting, a fortieth indicator indicating an invalid device, a forty-first indicator indicating an invalid address.

In some embodiments, the new user interaction comprises one or more of (1) a login attempt, (2) an authentication attempt, (3) a user profile data change attempt, (4) an account detail change attempt, (5) a payments method change attempt, and/or (6) a checkout action.

Some embodiments further comprise:
compiling a list of bad actors from the plurality of online service provider systems;
comparing the information against the list of bad actors; and
if the comparing indicates the user is on the list of bad actors, sending a report to the client system.

Some embodiments further comprise:
providing a honeypot e-mail address;
receiving an e-mail message at the honeypot e-mail address; and
adding a sender of the e-mail message to a list of bad actors.

Some embodiments further comprise:
applying one or multiple models from a machine learning (ML) registry to the second data to compute the identity risk score.

Some embodiments further comprise:
modifying or transforming the API response on a per-client basis or per-API-request basis, for a particular input and website, with a weighting of the identity risk score.

Some embodiments further comprise:
modifying or transforming the API response in real time using feedback data based on the API request.

Some embodiments further comprise a computer system comprising:

one or more processors; and a storage medium storing instructions, which when executed by the one or more processors, cause the computer system to implement the method.

Some embodiments include non-transitory computer-readable storage medium storing instructions, which when executed by at least one processor of a computer system, causes the computer system to carry out the method.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the identity risk determination system, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which:

FIG. 16 is a block diagram showing an address normalization module.

DETAILED DESCRIPTION

Figure 1:
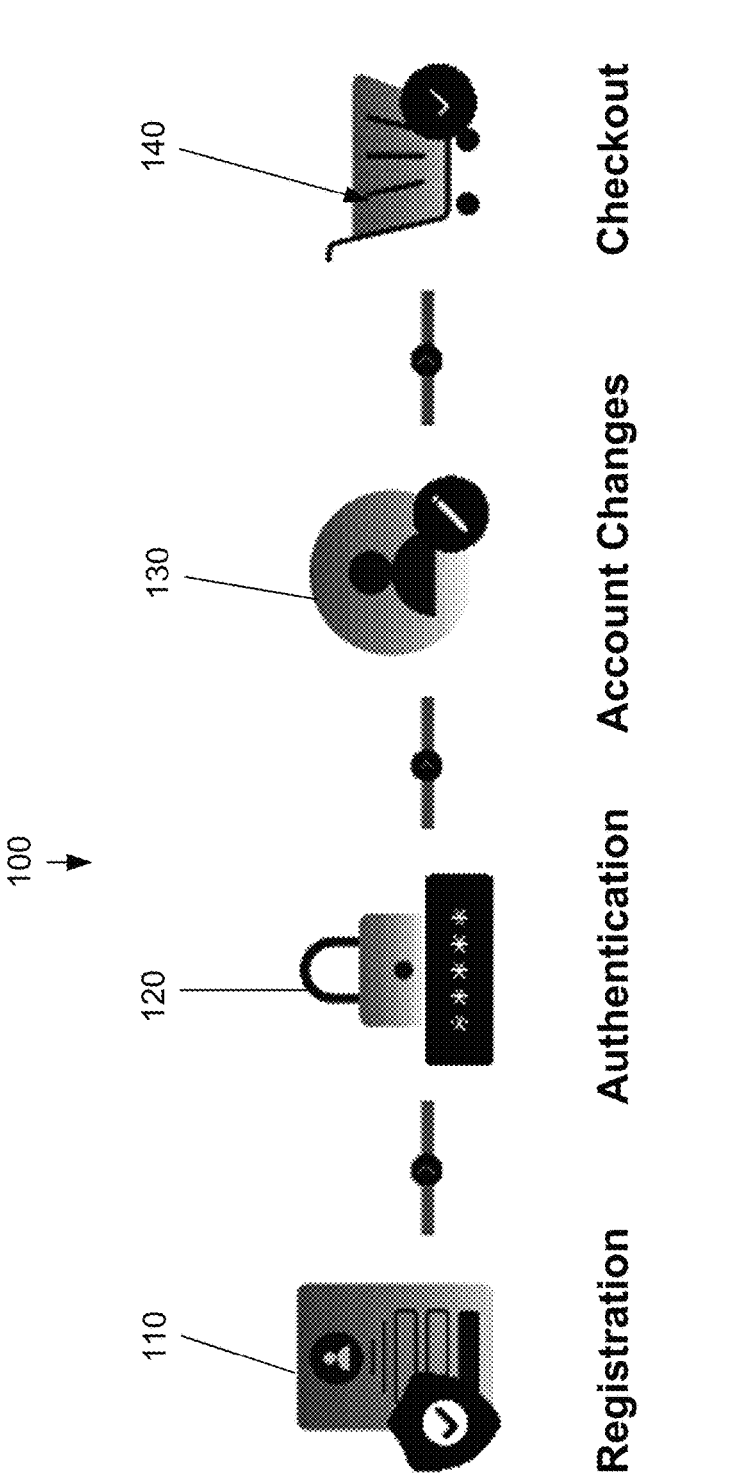
FIG. 1 is a representation of at least a portion of an exemplary identity risk determination system in accordance with at least one embodiment of the present disclosure.

The identity risk determination system of the present disclosure builds interaction profiles based on user event data (e.g., online user interactions) received from a data coalition, which can then be used by a computational engine to evaluate user events and determine the trustworthiness of the users generating the events.

Inputs are provided to the system that include not only user inputs, but also a plurality risk data from a variety of network sources (e.g., hundreds or more different variables to describe a single user interaction in some cases). These inputs are used to generate risk signals that provide evidence of the trustworthiness or risk of the user or the user interaction. The risk signals can then be used to generate a risk score. Furthermore, the inputs, risk data, risk signals, and risk scores may be fed back into the model (e.g., a machine learning model) to improve the reliability of future risk assessments. Some inputs and/or signals may for example come from the dark web, which might be controversial for some users, and might be inaccessible for some users. The system can also collect touch points on a user over time, such as the pages visited, time spent on a page, etc., and use that information to help determine whether or not the user is a human, a bot, an impostor, etc.

The system might thus comprise an input section, an enrichment section, and an analysis section, such that diverse inputs and signals, representing heterogeneous data types and sources, can be categorized, compared, combined, and/or functionalized, such that the model can generate a compact set of output signals that are reportable through the API, and that can be used to determine the overall risk score. The system may for example classify the user or the user interaction based on familiarity, time of day, and other signals that are more likely to uniquely distinguish a particular user or type of user. Because the system employs not only user activity but also device and network behavior, it is capable of distinguishing fraudulent interactions that would otherwise go unnoticed. Similarly, by reporting a cluster of data signals through the API, the system provides customers with clear insight into the types and sources of attempted fraud on their networks. One non-limiting example includes an "impossible travel" signal that may indicate, for example, that a particular user is in two places at once. The disclosed system can request user inputs (e.g., to verify whether or not the user is responsible for a particular transaction), and can that input to dynamically update a model or dataset that has future impact on how future risk assessments are calculated. The system is also sophisticated enough to understand that, for example, all of the users on a given proxy network are not high risk, simply because a known bad actor has made use of that proxy network. Thus, the API response returned by the system includes not only the risk score itself, but also the risk signals that provide descriptive evidence as to why the risk score is what it is.

The identity risk determination system aids substantially in protecting the security of online services and websites, by improving the quality and responsiveness of fraud detection. Implemented on a server in communication with a client system, the identity risk determination system disclosed herein provides practical, real-time identity insights to facilitate detection of unauthorized access or impersonation. This streamlined/improved/augmented security process transforms a slow, uncertain process into one that unfolds in real time, without the normally routine need to rely on clients or users to discover the fraud themselves. This unconventional approach improves the functioning of the client system, by offloading security tasks to the server while improving the speed and accuracy of fraud detection.

The identity risk determination system may be implemented as an application program interface viewable on a display, and operated by a control process executing on a processor that accepts user inputs from a keyboard, mouse, or touchscreen interface, and that is in communication with one or more client systems. In that regard, the control process performs certain specific operations in response to different inputs or selections made at different times. Certain structures, functions, and operations of the processor, display, sensors, and user input systems are known in the art, while others are recited herein to enable novel features or aspects of the present disclosure with particularity.

These descriptions are provided for exemplary purposes only, and should not be considered to limit the scope of the identity risk determination system. Certain features may be added, removed, or modified without departing from the spirit of the claimed subject matter.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

FIG. 1 is a representation of at least a portion of an exemplary identity risk determination system 100 in accordance with at least one embodiment of the present disclosure. The identity risk determination system may assess user activity and generate or modify that user's identity score based on activity occurring during any phase of the user's interaction with an online platform, including but not limited to registration 110, login/authentication 120, changing of user data 130 such as user profile data, account details, payment methods or details, etc., and checkout 140.

The examples described herein are provided for purposes of illustration, and are not intended to be limiting. Other devices and/or device configurations may be utilized to carry out the operations described herein.

Figure 2:
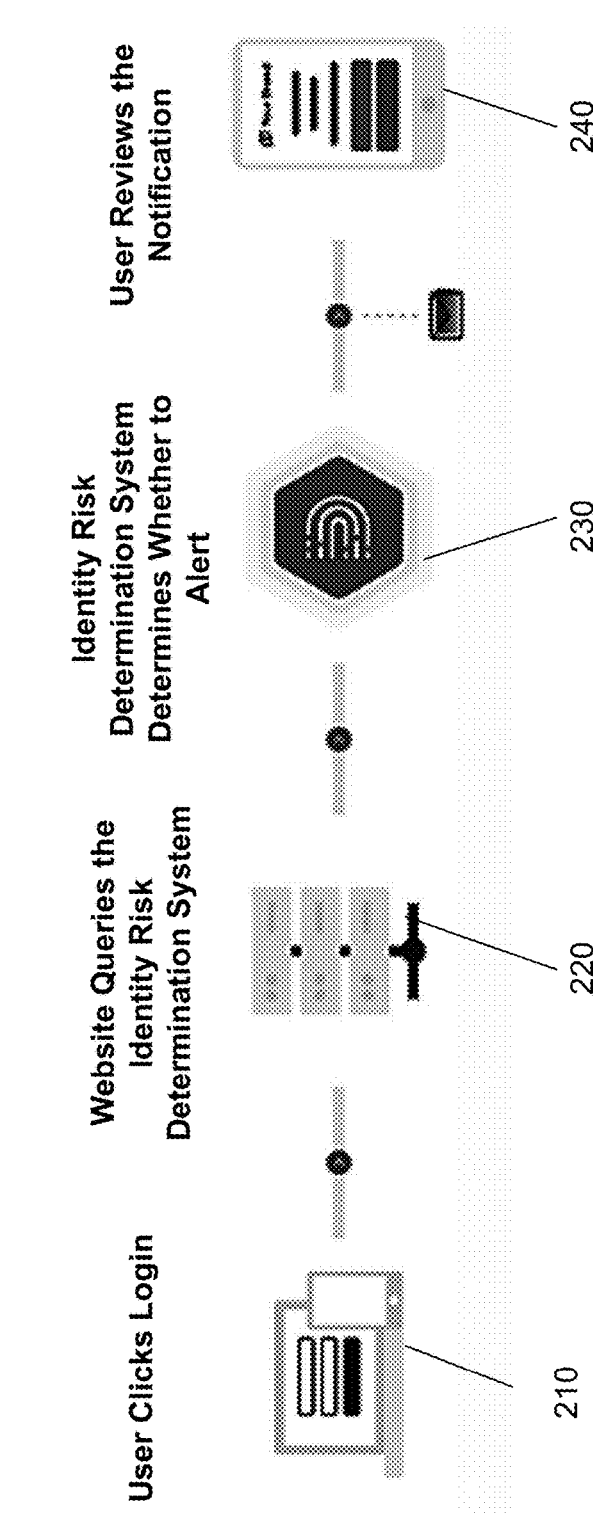
FIG. 2 is a representation of at least a portion of an exemplary identity risk determination system in accordance with at least one embodiment of the present disclosure.

FIG. 2 is a representation of at least a portion of an exemplary identity risk determination system in accordance with at least one embodiment of the present disclosure. In an exemplary workflow, step 210 occurs when a user attempts to log in to a website, mobile app, or other online system. In step 220, the online system queries the identity risk determination system using the available information about the user. Such information may include, but is not limited to, the username and password, number of failed login attempts, velocity of login attempts, geographic origin of login attempts, and the device from which the user is logging in. In step 230, the identity risk determination system determines, based on that user's current identity score, whether to issue an alert to the user. If an alert is issued, it may take the form of an e-mail message, text message, audio message, instant message, or other message type that permits the user to reply. In step 240, the user responds either YES (e.g., the user was responsible for this login attempt) or NO (e.g., the user was not responsible for this login attempt. In some embodiments, the user's input/response may then become part of a training dataset that allows the system to learn from user behavior across the network, thus gradually improving threat recognition over time.

Although the particular example of a login attempt is shown in FIG. 2, a similar process may be followed for other types of online activity, such as altering user profile data or account details, changing of payment details, checkout, etc.

Use of the identity risk determination system by an online platform may involve several steps, including but not limited to API initialization, data backfill, script data ingestion, event data ingestion, and identity risk scoring. The online platform may for example be part of a cloud consortium or network of customers with access (e.g., paid subscriptions) to the API. Queries against the API may be authenticated using a combination of a site identifier and an API key. This information may for example be provided by the identity risk determination system during onboarding, along with appropriate API endpoints for each available action. In an example, the site identifier is publicly used when initializing a script (e.g., JavaScript code). The identity risk determination system may also include libraries to assist online platforms with the core functionality of the identity risk determination system across different programming languages, which may include but are not limited to Rails, Ruby, Perl, Python, PHP, Go, Java, and .NET. In an example the data backfill is a one-time onboarding process which establishes seed data. The seed data may for example enable the identity risk determination system to gain awareness of the user's relationship with the online platform, although other data available to the identity risk determination system may in many cases provide awareness of this relationship without the need for seed data. JavaScript data ingestion involves the customer or online service integrating a dynamic JavaScript widget into every page following user authentication. The widget is used to create a relationship between a user's identity and their browser's profile, as well as bad actors who are manipulating device, network, or browser parameters. The widget can thus detect anomalies in browsing behavior. In the event data ingestion step, the identity risk determination system receives user event data from the customer's online service platform, using a secure server-to-server API request. This event data may for example include user actions and outcomes such as login failures, account creates, and confirmed fraud data or chargebacks. For each event, the identity risk determination system returns an identity score via a server-to-server API request for a given user identity (e.g., a given hashed e-mail account and IP combination).

Figure 3:
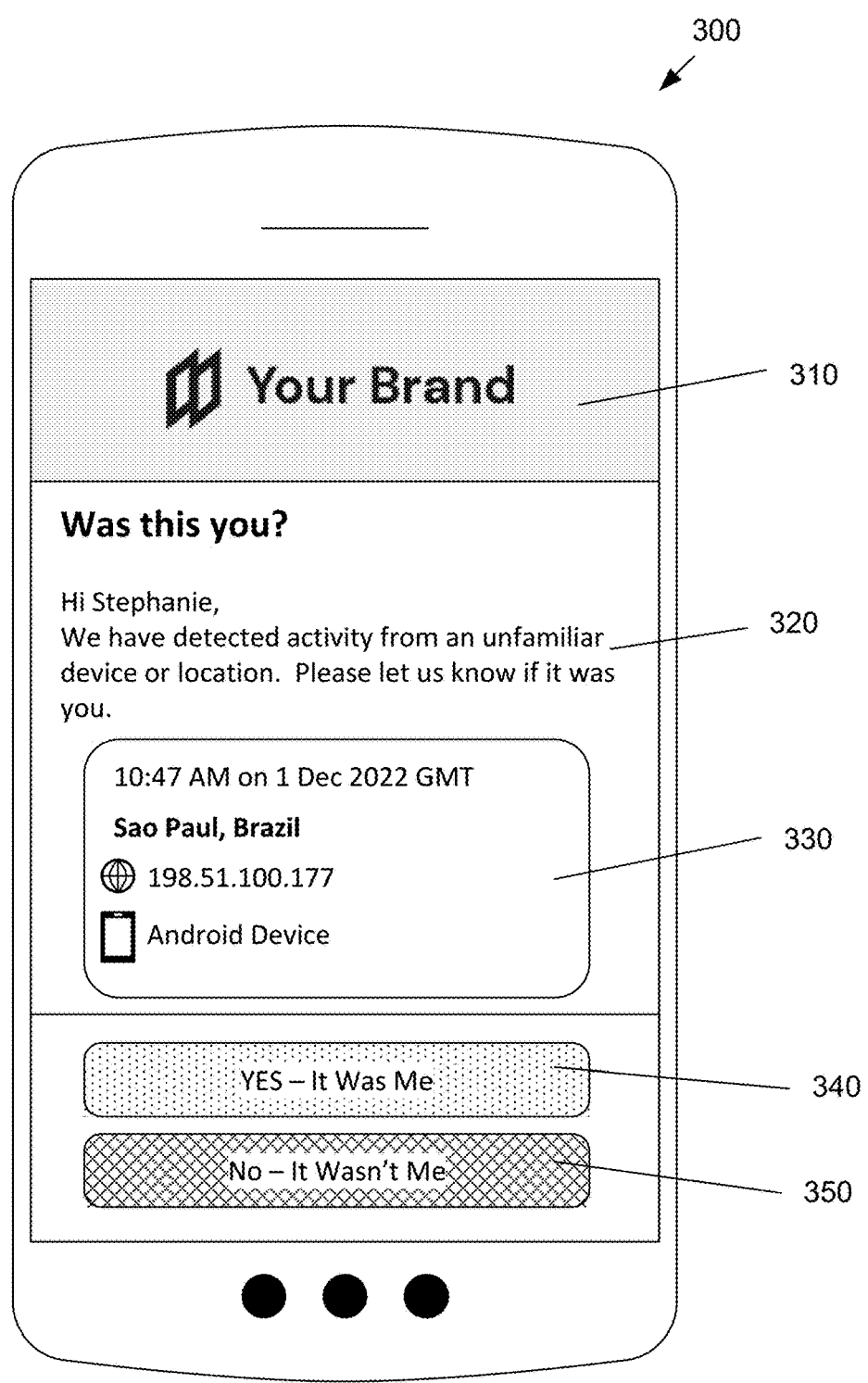
FIG. 3 is a representation of an exemplary user alert, in accordance with at least one embodiment of the present disclosure.

FIG. 3 is a representation of an exemplary user alert, in accordance with at least one embodiment of the present disclosure. The user alert includes a brand or logo 310 of the online service provider, a query 320 addressed to the user, a block of text and/or graphics 330 describing the suspicious activity, a YES button 340, and a NO button 350.

Figure 4:
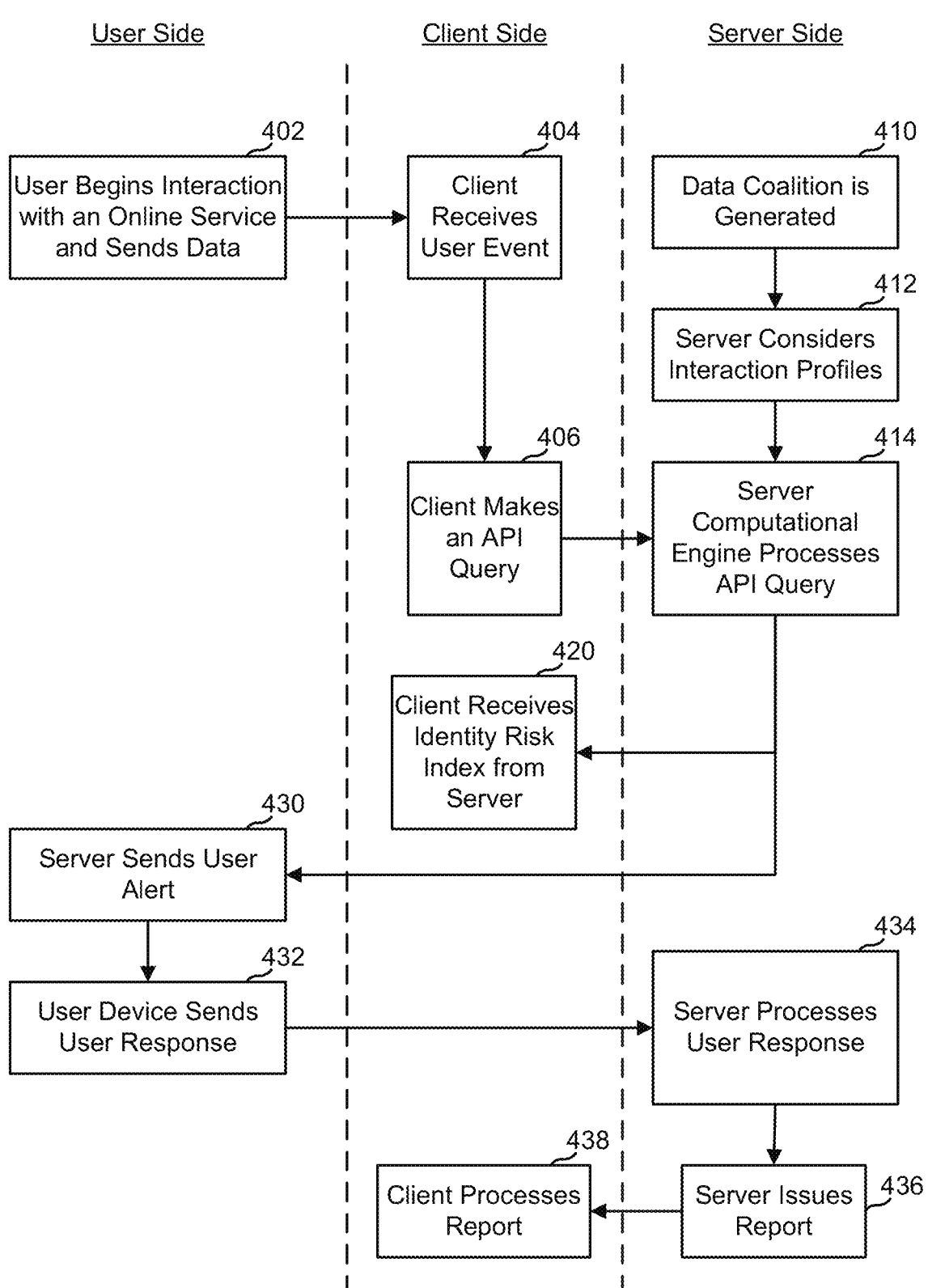
FIG. 4 shows a schematic representation, in block diagram form, of at least a portion of an example identity risk determination system, in accordance with at least one embodiment of the present disclosure.

FIG. 4 shows a schematic representation, in block diagram form, of at least a portion of an example identity risk determination system, in accordance with at least one embodiment of the present disclosure. It is understood that the steps of the diagram may be performed in a different order than shown in FIG. 4, additional steps can be provided before, during, and after the steps, and/or some of the steps described can be replaced or eliminated in other embodiments. One or more of steps can be carried by one or more devices and/or systems described herein, such as components of the computer system 500.

The identity risk determination system builds interaction profiles based on data (e.g., website data) received from the data coalition, which will be used by the computational engine to evaluate user events. For example, the identity risk determination system may build an identity profile to understand when and how a user interacts, including but not limited to categories of websites that a user visits; times of day they interact; networks they come from; devices they use; or plausible variances in this behavior over time based on frequency or velocity of the interactions. In step 402, a user interacts with an online service client in communication with the identity risk determination system. In step 404, the online service client receives the user event, and in step 406, generates an API query associated with the user event.

The following code sample in Table 1 illustrates an example API request.

TABLE 1

```
json https post {
site,             // Site ID
apikey,           // Deduce provided API Key
testmode,         // Flag for setting test mode for QA
email,            // Client's email address
ip,               // Client's IP address
device_id,        // Client's IDFA/AAID/Fingerprint/Token/Device ID
user_agent,       // Client's UserAgent
action,           // Client's placement and outcome
reference_id      //Optional.Callback URL reference ID
}
```

Other information may also be included, such as user history indicating for example whether the user's account has ever been suspended or charged back, or other relevant historical data about the user.

In step 410, a data coalition is generated, and in step 412, the server considers the interaction profiles. In step 414, the server computational engine processes the API query. In an example, the API responds with a standard HTTP response code [200 OK] upon success. Depending on the implementation, the API can be called asynchronously along with other methods. In some embodiments, data may be transmitted to and from the API over HTTPS>TLS 1.2 and encrypted with AES-256. During user authentication, the computational engine (via the API) receives the API query, which may include the user's e-mail, IP address, and device ID for evaluation.

Using device and geolocation information, the computational engine identifies suspicious authentications by calculating an identity score (e.g., a numerical value between 0 and 1, with higher values indicating higher risk). This calculation may for example involve machine learning based on training data received from the data coalition, or on expert systems or other algorithms that apply weights to different input data in order to generate output data. The computational engine then reports the identity score to the client or online service provider. In some embodiments, if the device ID of the login source device is not available, the identity risk determination system may calculate an identity score based on the user's IP geolocation. In some cases, it may be desirable to use both geolocation and device ID to maximize accuracy. The API can then report one or more risk signals in the API response, along with a risk score.

Risks data may fall into categories that identify the general nature of the data, and may include, but are not limited to: activity data (e.g., new email address or IP address), device risks (e.g., device brand and operating system), geographic risks (e.g., country and city), and network risks (e.g., use of a virtual private network). Signals reported by the API may also fall into categories, including but not limited to trust signals (e.g., familiar email and IP address for this user, e.g., based on past interactions with that particular user), information signals (e.g., network risks, e.g., educational, mobile, or VPN networks), and risk signals (e.g., new account or new city for this user, e.g., based on past interactions with that particular user). A high identity risk score may thus, for example, be reported whenever a user authenticates from a new device or an unknown location, when a certain number of failed login attempts have occurred, or when the velocity of user interactions exceeds a threshold value, although the system may also include settable thresholds to determine alerting frequency and sensitivity.

Depending on the implementation, the system may also include additional functionality which establishes a user's most frequent or home location. This can be used for example to establish whether current activity is from this location, or whether an entered address (billing/shipping/profile/etc.) is within proximity of a known location. The system may also have functionality to return a categorical distance (e.g., 0-100 km [trust], 100-250 km [risk], 250-500 km [risk], 500-1000 km [risk]) from a known location and an entered address. The system may also have functionality to determine the age of an account, and when an account is new. The system may also have functionality to determine email tag, alias cycling, invalid emails, as well as the use of disposable emails and domains. The system may have functionality to return cycling signals based on the interaction of two common elements email and IPs, IPs and addresses, emails and devices, etc. Categorically, these and other signals can be captured in blocks as: activity, geo-spatial, network, anomaly, and cycling signals. The system may include an ability to apply one or multiple models from the ML model registry, in an ensemble, for a single input or query to compute a response that includes the identity risk score. The system may include an ability to modify or transform the output, uniquely, on a per client or per-query basis, for a particular input and website, with a unique weighting or risk tolerance. The system may include an ability to use feedback data in real-time to affect the response (rather than just stored data). The query itself can thus be submitted multiple times to the API and used as feedback onto itself. One such example is velocity of email over multiple IPs, resulting in cycling, resulting in a dynamic change in the response for the exact same identity and query (email address/IP address/device ID/etc.).

As examples of trust signals, the API might signal at least one of a null indicator, a first indicator indicating that an e-mail address and IP address of the user are a match, a second indicator indicating that the IP address is familiar from past interactions with the user, a third indicator indicating that a carrier of the user is familiar from past interactions with user, a fourth indicator indicating that a device of the user is familiar from past interactions with the user, a fifth indicator indicating that a country of the user is familiar from past interactions with the user, a sixth indicator indicating that a state of the user is familiar from past interactions with the user, a seventh indicator indicating that a city of the user is familiar from past interactions with user, an eighth indicator indicating that a time zone of the user is familiar from past interactions with user, a ninth indicator indicating that a time of day of the new user interaction is familiar from past interactions with user, and/or a tenth indicator indicating that a network subnet of the user is familiar from past interactions with user.

As examples of risk or informational signals, the API might signal at least one of a null indicator, a first indicator indicating that an account of the user is newer than a predetermined age, a second indicator indicating that a device of the user is a mobile device, a third indicator indicating that the device of the user is newer than a threshold age, a fourth indicator indicating that the device of the user has been seen for the user fewer than a first threshold number of times, a fifth indicator indicating that the user is on a mobile network, a sixth indicator indicating that a city of the user has been seen for the user fewer than a second threshold number of times, a seventh indicator indicating that a state of the user has been seen for the user fewer than a third threshold number of times, an eighth indicator indicating that a country of the user has been seen for the user fewer than a fourth threshold number of times, a ninth indicator indicating that a time zone of the user has been seen for the user fewer than a fifth threshold number of times, a tenth indicator indicating that an e-mail address of the user has been seen for the user fewer than a sixth threshold number of times, an eleventh indicator indicating that an IP address of the user has been seen for the user fewer than a seventh threshold number of times, a twelfth indicator indicating that a network of the user has been seen for the user fewer than an eighth threshold number of times, and/or a thirteenth indicator indicating that a subnet of the user has been seen across changing IP addresses fewer than a ninth threshold number of times.

If the identity score exceeds a specified threshold value, the computational engine may generate a user alert, which is sent to the user. The user's response (if any) is returned to the computational engine, which may (a) update the interaction profiles, (b) generate an internal report, and (c) generate a client report that is sent to the client or online service. The report may contain actionable intelligence about the suspicious user interaction, which the client or online service provider may use to halt fraudulent or unauthorized access to their systems. The report, or a plurality of reports or summary thereof, may for example also be used by the client or online service provider for marketing purposes, or to demonstrate regulatory compliance, SOC 2 compliance, or compliance with other industry standards.

In some embodiments, the identity risk determination system may also provide "honeypot" e-mail accounts to identify breaches in credential stuffing attacks, and their use across consumer and partner websites. In an example, the honeypot e-mail account includes a publicly available or searchable e-mail address that serves to attract spammers and other unauthorized users, and serves no other purpose, so when an e-mail is received by that account, it can be presumed to be spam. The sender of the e-mail can thus be presumed to be a spammer, and may therefore be added to a database of bad actors.

The risk score, along with other information used to generate the risk score, may be accessed for example by querying an application program interface (API), which then generates and returns an API response whose contents depend on the risk score, and the information used to generate the risk score. For example, in some embodiments, an API response for a trusted user interaction might take the form shown in Table 2.

16

TABLE 2

```
{
  "data": {
    "activity": {
      "email": {
        "frequency": 1970,
        "lastseen": "2022-02-12",
        "ip_count": 192
      },
      "emailip": {
        "frequency": 376,
        "lastseen": "2021-08-23",
        "rank_email": 2,
        "match": true,
        "rank_ip": 1
      },
      "ip": {
        "lastseen": "2022-02-05",
        "frequency": 1491,
        "email_count": 45
      }
    },
    "alert": false,
    "alerts_enabled": true,
    "device": {
      "ua_brand": "apple",
      "ua_browser": "safari",
      "ua_device_type": "desktop",
      "ua_name": "mac",
      "ua_os": "macos 11",
      "ua_type": "browser",
      "ua_version": "14.1"
    },
    "geo" : {
      "country": "US",
      "state": "New Mexico",
      "city": "Albuquerque",
      "lat": "35.084490",
      "long": "-106.651140"
    },
    "network" : {
      "isp_asn": "AS7922",
      "isp_name": "ISP COMPANY 1 ",
      "company_name": "ISP Company Services, Inc. ",
      "vpn_name": null,
      "is_vpn_confirmed": false,
      "is_vpn_suspect": false,
      "is_vpn_capable": false,
      "is_tor": false,
      "is_hosting": false,
      "is_corporate": false,
      "is_education": false,
      "is_mobile": false,
      "is_proxy": false,
      "crawler_name": null
    },
    "sent_timestamp": 1644868412.5716,
    "signals": {
      "trust": [
        "ACTIVITY_MATCH_EMAILIP",
        "ACTIVITY_FAMILIAR_IP",
        "ACTIVITY_FAMILIAR_SUBNET",
        "ACTIVITY_FAMILIAR_NETWORK"
        "ACTIVITY_FAMILIAR_GEO_COUNTRY",
        "ACTIVITY_FAMILIAR_GEO_STATE"
        "ACTIVITY_FAMILIAR_GEO_CITY",
        "ACTIVITY_FAMILIAR_GEO_TIMEZONE",
        "ACTIVITY_FAMILIAR_TIMEOFDAY"
      ],
      "info": [ ],
      "risk": [
        "ACTIVITY_NEW_DEVICE"
      ]
    },
    "score": {
      "score": 0.03,
      "label": "TRUSTED"
    }
  }
}
```

17

Similarly, in some embodiments, an API response for a high-risk user interaction might take the form shown in Table 3.

TABLE 3

```
{
    "data": {
        "activity": {
            "email": {
                "frequency": 1970,
                "lastseen": "2022-02-12",
                "ip_count": 192
            },
            "emailip": {
                "frequency": null,
                "lastseen": null,
                "rank_email": null,
                "match": false,
                "rank_ip": null
            },
            "ip": {
                "lastseen": null,
                "frequency": null,
                "email_count": null
            }
        },
        "alert": true,
        "alerts_enabled": true,
        "device": {
            "ua_brand": "apple",
            "ua_browser": "safari",
            "ua_device_type": "desktop",
            "ua_name": "mac",
            "ua_os": "macos 11",
            "ua_type": "browser",
            "ua_version": "14.1"
        },
        "geo": {
            "country": "US",
            "state": "Ohio",
            "city": "Hilliard",
            "lat": "40.033400",
            "long": "-83.158250"
        },
        "network": {
            "isp_asn": "AS16509",
            "isp_name": "Cloud Provider 2",
            "company_name": "Cloud Provider, Inc. ",
            "vpn_name": null,
            "is_vpn_confirmed": false,
            "is_vpn_suspect": false,
            "is_vpn_capable": false,
            "is_tor": false,
            "is_hosting": true,
            "is_corporate": false,
            "is_education": false,
            "is_mobile": false,
            "is_proxy": false,
            "crawler_name": null
        },
        "sent_timestamp": 1644868481.6597,
        "signals": {
            "trust": [
                "ACTIVITY_FAMILIAR_GEO_COUNTRY",
            ],
            "info": [
                "ACTIVITY_INFREQUENT_GEO_TIMEZONE"
            "risk": [
                "ACTIVITY_NEW_IP",
                "ACTIVITY_NEW_SUBNET",
                "ACTIVITY_NEW_NETWORK",
                "NETWORK_HOSTING",
                "ACTIVITY_NEW_GEO_STATE"
                "ACTIVITY_NEW_GEO_CITY",
                "ACTIVITY_NEW_DEVICE",
                "RISK_IMPOSSIBLE_TRAVEL"
            ]
        },
        "score" : {
            "score": 0.97,
```

18

TABLE 3-continued

```
            "label": "HIGH RISK"
        }
    }
}
```

Other API responses or types of API responses may for example be generated for risk scores having values other than "TRUSTED" or "HIGH_RISK", including but not limited to "NO_RISK", "LOW_RISK", "MED_RISK", and others, depending on the implementation.

In step 420, the client receives the identity score or identity risk score from the server. In step 430, if needed based on the risk index or risk score, the server sends an alert to the user indicating a potentially fraudulent transaction. In step 432, the user responds with a Yes or No as described above. In step 434, the server processes the user response, and in step 436, the server issues a report or other output, which is received and processed by the client in step 438.

Figure 5:
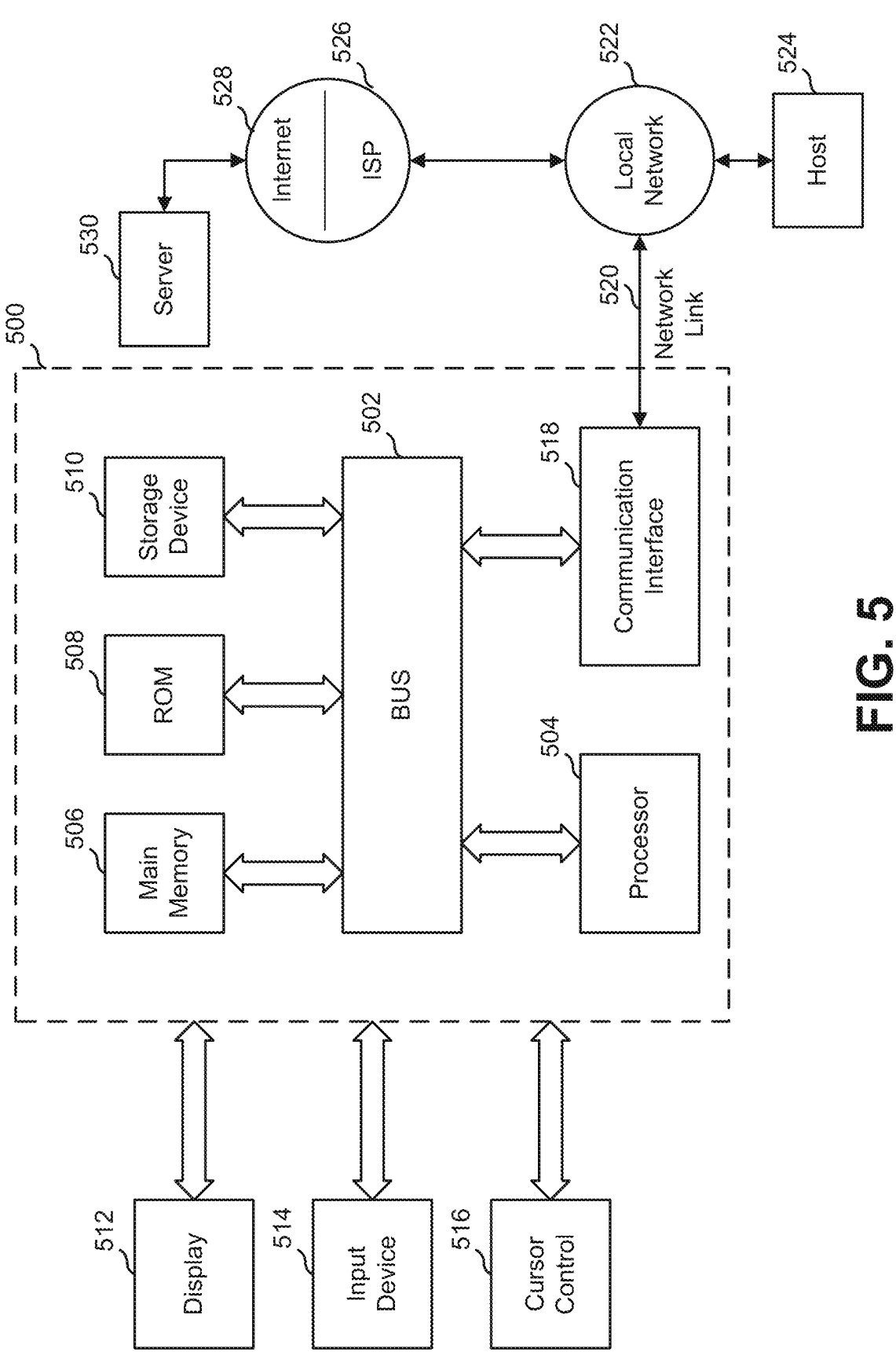
FIG. 5 is a block diagram that illustrates an example computer system upon which the systems described herein may be implemented.

FIG. 5 is a block diagram that illustrates an example computer system 500 upon which the systems described herein may be implemented. Computer system 500 includes a bus 502 or other communication mechanism for communicating information, and a processor 504 coupled with bus 502 for processing information. Processor 504 may be, for example, a general-purpose microprocessor.

Computer system 500 also includes a main memory 506, such as a random-access memory (RAM) or other dynamic storage device, coupled to bus 502 for storing information and instructions to be executed by processor 504. Main memory 506 may also be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a computer monitor, for displaying information to a computer user. An input device 514, including alphanumeric and other keys, is coupled to bus 502 for communicating information and command selections to processor 504. Another type of user input device is a cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may include non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that include bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a network connection. A modem or network interface local to computer system 500 can receive the data. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be a network card, a modem, a cable modem, or a satellite modem to provide a data communication connection to a corresponding type of telephone line or communications line. Wireless links may also be implemented. In any such implementation, communication interface 518 sends and receives electrical, electromagnetic, or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world-wide packet data communication network now commonly referred to as the "Internet" 528. Local network 522 and Internet 528 both use electrical, electromagnetic, or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520, and communication interface 518. In the Internet example, a server 530 might transmit a requested code for an application program through the Internet 528, ISP 526, local network 522, and communication interface 518. The received code may be executed by processor 504 as it is received, and/or stored in storage device 510, or other non-volatile storage for later execution.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The code may also be provided carried by a transitory computer readable medium e.g., a transmission medium such as in the form of a signal transmitted over a network.

Communication may be accomplished using any suitable wireless or wired communication technology, such as a cable interface such as a USB, micro-USB, Lightning, or FireWire interface, Bluetooth, Wi-Fi, ZigBee, Li-Fi, or cellular data connections such as 2G/GSM, 3G/UMTS, 4G/LTE/WiMax, or 5G. For example, a Bluetooth Low Energy (BLE) radio can be used to establish connectivity with a cloud service, for transmission of data, and for receipt of software patches. The controller may be configured to communicate with a remote server, or a local device such as a laptop, tablet, or handheld device, or may include a display capable of showing status variables and other information.

Communication, if any, within or between the components of the computer system 500 may be through numerous methods or protocols, such as SPI, RS-232, RS-485, CAN, Ethernet, ARINC 429, MODBUS, MIL-STD-1553, or any other suitable method or protocol. Parallel protocols including but not limited to ISA, ATA, SCSI, PCI, IEEE-488, IEEE-1284, and other suitable protocols. Where appropriate, serial and parallel communications may be bridged by a UART, USART, or another appropriate subsystem.

Figure 6:
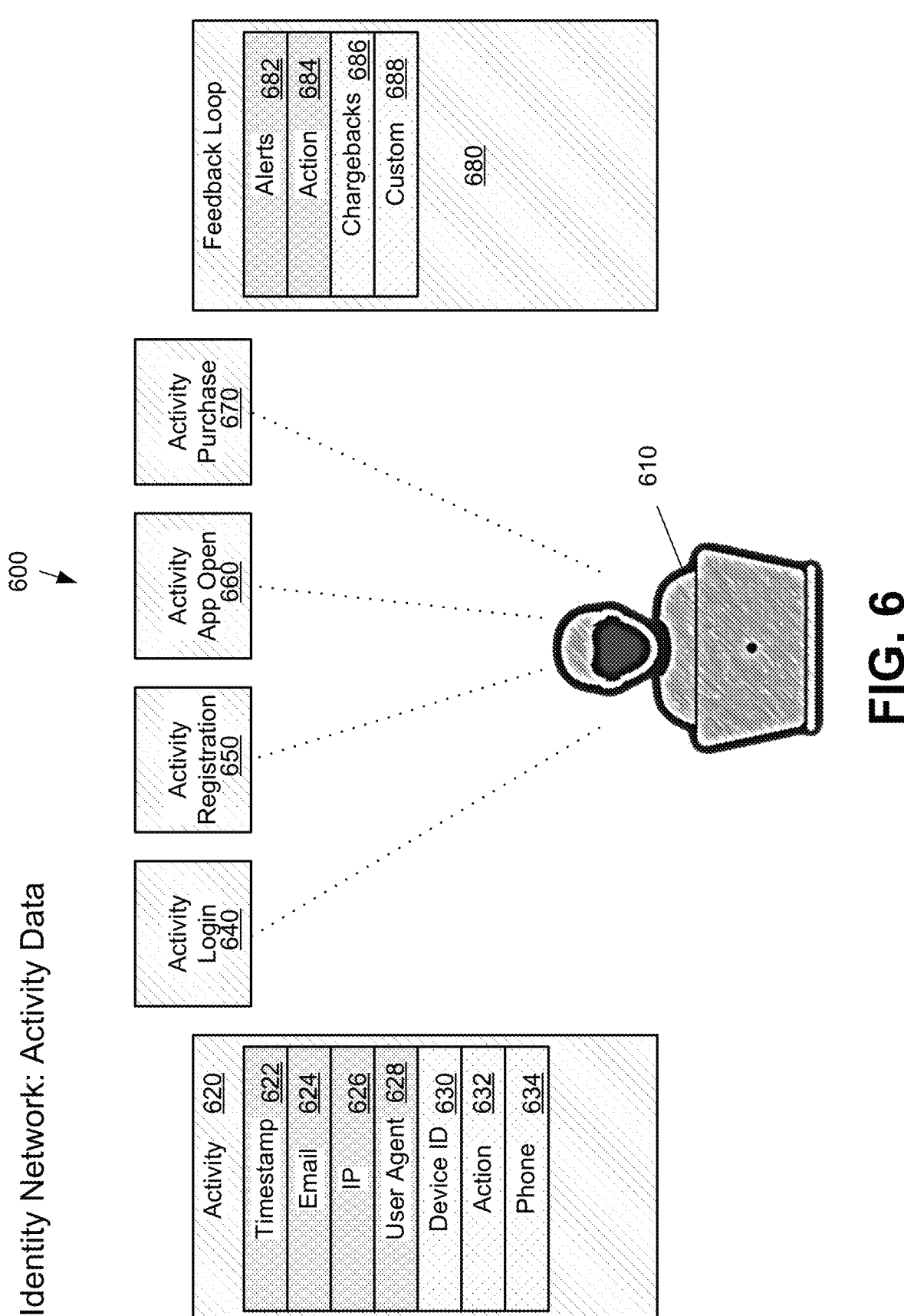
FIG. 6 is a block diagram that illustrates example identity network activity data.

FIG. 6 is a block diagram 600 that illustrates an example of identity network activity data, activity data 620. The identity network activity data includes system activities such as timestamping 622, email 624, Internet Protocol (IP) traffic 626, user agents 628, device IDs 630, other actions 632, and phone traffic 634. The identity network activity data also includes user activities such as logging onto a system 640, account registration 650, opening applications 660, and making purchases 670. The identity network activity data also includes a security feedback loop 680 that generates actions such as alerts 682, security actions 684, chargebacks 686, and custom (system-specific) actions 688.

Figure 7:
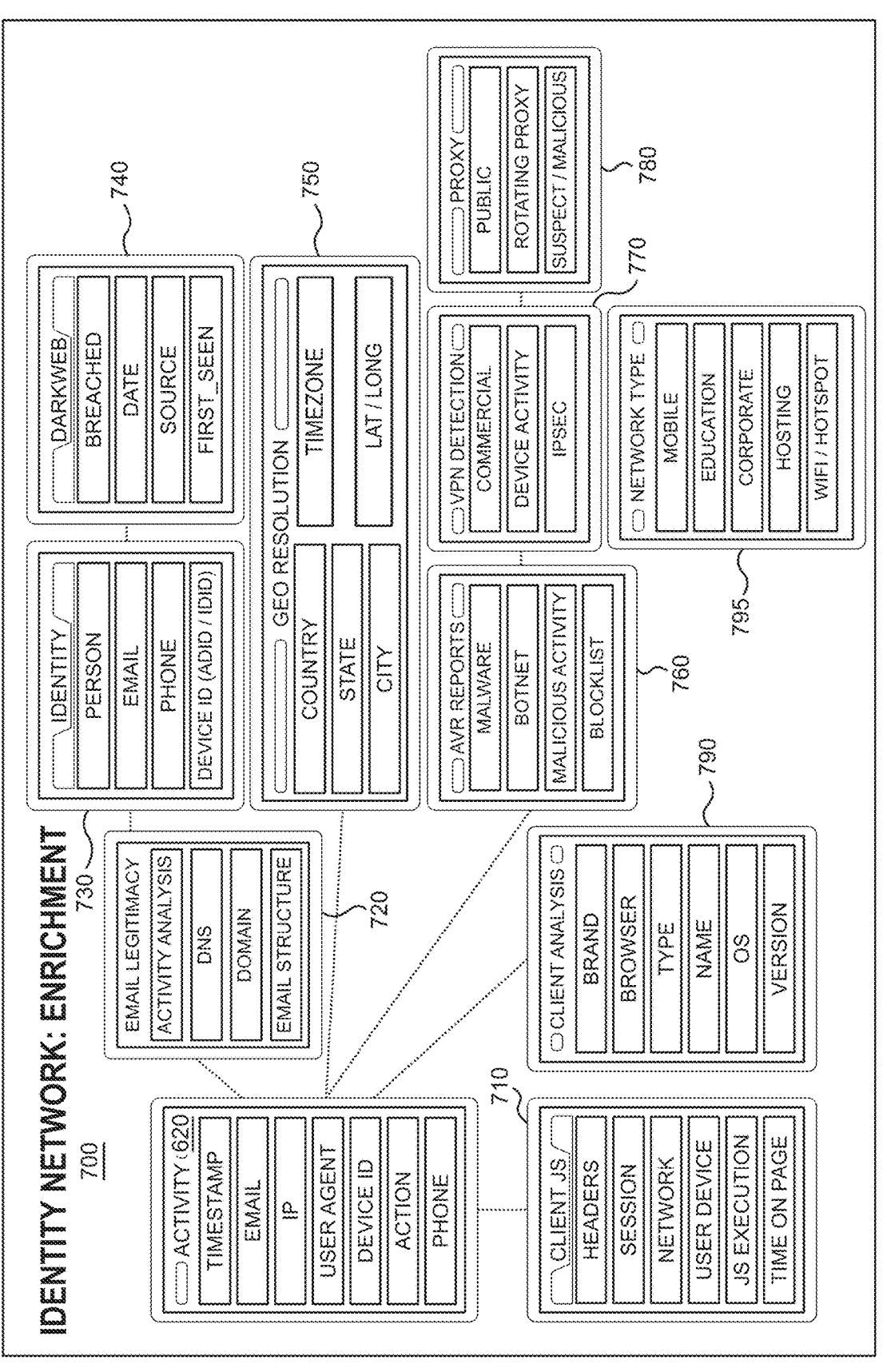
FIG. 7 is a block diagram that illustrates example enrichments for the system actions described above in FIG. 6.

FIG. 7 is a block diagram 700 that illustrates example enrichments for the system actions described above in FIG. 6. For example, client JavaScript enrichments 710 may include headers, session information, network information, device information, JavaScript execution, and time on page information. Email legitimacy information 720 may include activity analysis, domain name system information, domain information, and email structure. Device analysis information 790 may include the device brand, the browser being used, the type of device (e.g., phone, tablet, laptop, desktop, etc.), device name or model, device operating system, and operating system version number. Identity information 730 may include identifying information about the person (e.g., name, address, date of birth, etc.), their email address, their phone number, or identifying information about the device they are using such as ADID or IDID metadata. Dark web information 740 may include whether a particular identity has been breached, the date and source of the breach, and when the breach was first seen. Geographic resolution data 750 about the origin of the interaction may include the country, state, and city, time zone, and latitude and longitude. Antivirus report (AVR) data 760 may include information about any detected malware, botnets, malicious activity, or block-listed/watch-listed identity data or system data. Virtual private network (VPN) detection data 770 may include whether a commercial VPN is detected, any known device activity, or Internet protocol security (IPSEC) data. Proxy data 780 may include whether the interaction originates from a public network, a proxy network, a rotating proxy, a suspect network or proxy, or a known-malicious network or proxy. Network type information 795 may include whether the interaction originates from a mobile network, an educational institution network, a corporate network, an internet services provider (ISP) hosting network, or a Wi-Fi or mobile hotspot network. Any of these enrichments can be applied to an interaction for analysis on the basis of available input data such as email, IP, Device-ID, or others, to help determine whether the interaction is trusted, suspicious, or should be blocked.

Figure 8:
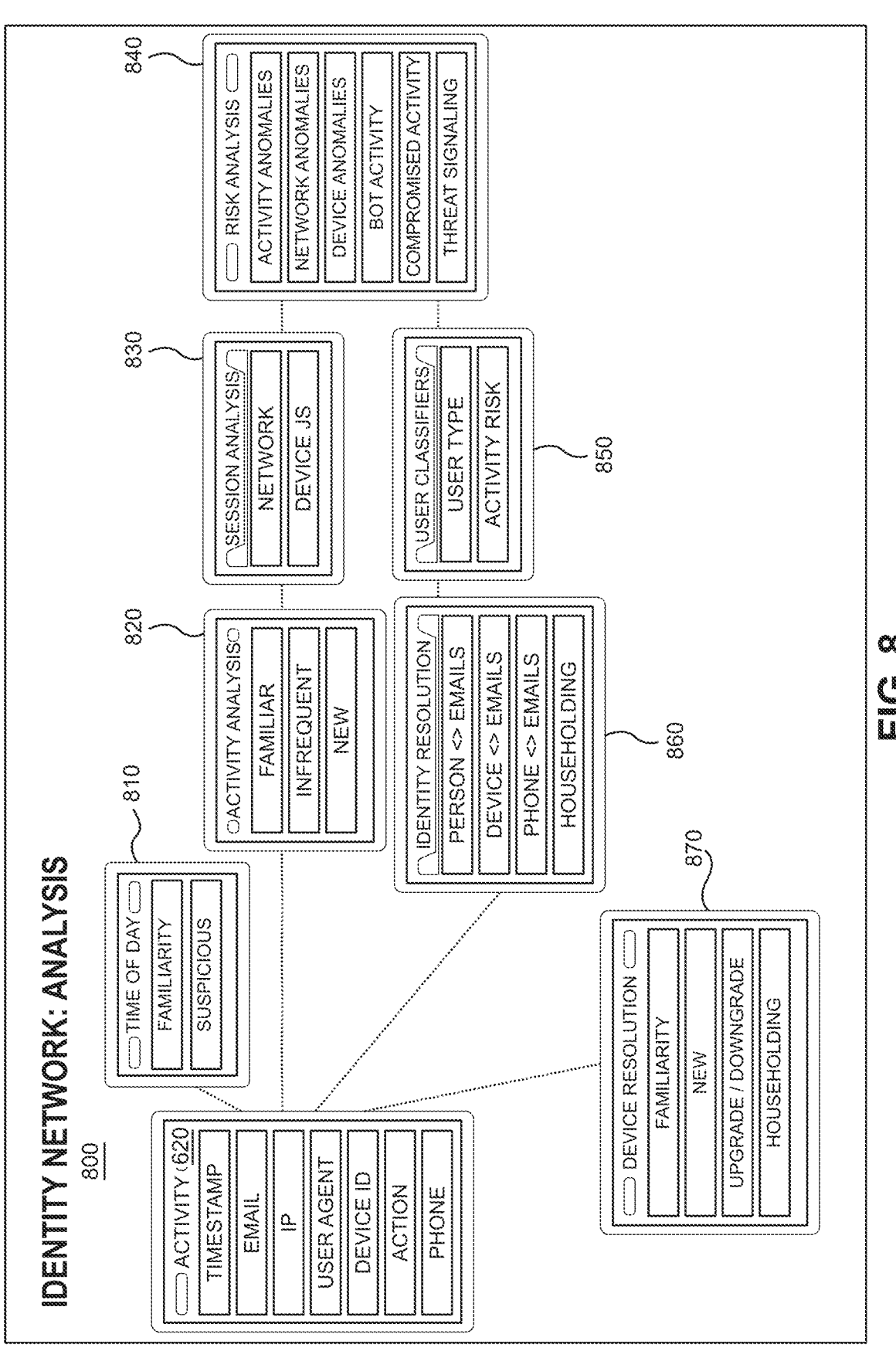
FIG. 8 is a block diagram that illustrates an example analysis of activities for the identity risk determination system disclosed herein.

FIG. 8 is a block diagram 800 that illustrates an example analysis of activities for the identity risk determination system disclosed herein. The original activity data 620 may include a timestamp, an email address, an Internet protocol (IP) address, a user agent, a device identification number such as a MAC address, a specific action taken or requested by the user, and/or a phone number. Time of day analysis 810 may include determining whether the user interaction occurs at a familiar (e.g., routine) time of day, or a suspicious (e.g., unusual for this user account) time of day. Device resolution analysis 870 may include whether the device is familiar or new, whether it has been upgraded or downgraded since the last interaction, and whether it is part of a familiar household. Activity analysis 820 includes whether the activity of the interaction is a familiar, infrequent, or brand-new activity for this particular identity or device. For example, if this identity or device often makes online purchases, but rarely makes purchases over $500, and has never made a purchase above $1000, then this information may be significant in determining to what degree the interaction is suspicious. Identity resolution analysis 860 may involve determining whether this person, device, or phone number is associated with particular emails or email addresses, or associated with a particular household. Session analysis 830 may include analyzing the network and device or devices associated with the interaction. User classifiers 850 may for example include the user type (e.g., person, organization, corporation) and the activity risk. For example, low-risk activities may include viewing web content or watching online videos, whereas moderate risk activities may include making online purchases, and high-risk activities may include opening new credit accounts. Risk analysis 840 may include looking for anomalies in the activity itself (e.g., malformed responses to online forms), in the network or device from which the activity originated, whether the activity is generated by a bot or a compromised account, and threat signaling analysis (for example, whether the activity includes actions typically associated with malicious activity). Any of these analyses, or combinations thereof, can be used to determine a risk index for the requested interaction.

Figure 9:
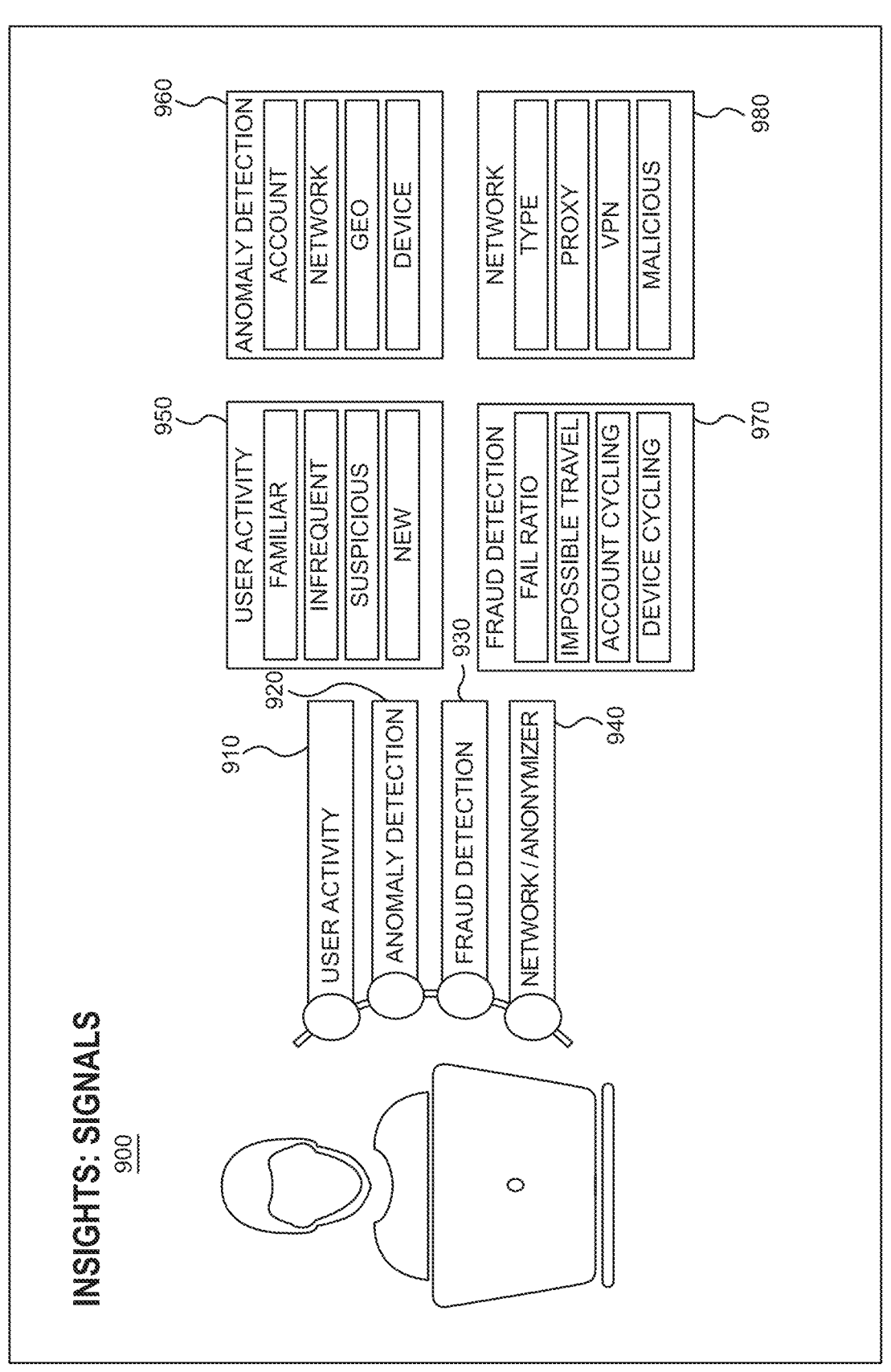
FIG. 9 is a block diagram that illustrates example signals that may be used by the identity risk determination system to assess the risk of a particular interaction request.

FIG. 9 is a block diagram that illustrates example signals that may be used by the identity risk determination system to assess the risk of a particular interaction request. For example, user activity signals 910, 950 may include whether the user activity is familiar, infrequent, suspicious, or new. Fraud detection signals 930, 970 may include a high failure ratio (e.g., numerous failed login attempts), impossible travel (e.g., events occurring from the same user on opposite sides of the world), account cycling, or device cycling. Anomaly detection signals 920, 960 may include irregularities in the account, network, geographical location, or device from which the interaction request originated. For example, a known user logging in from a previously unused account and device, originating from an unfamiliar geographic location, may be more suspicious than that same user logging in from home on their mobile phone. This may also include data inconsistencies in provided or observed data regarding the identity, such as the user's address, observed geo location, phone number, name, etc. Network signals or anonymizer signals 940, 980 may include the type of network, whether it is a proxy or VPN (and if so, what kind), and whether it is a known-malicious network. Any of these signals, or combinations thereof, can be used to assess the risk level associated with the interaction request.

Figure 10:
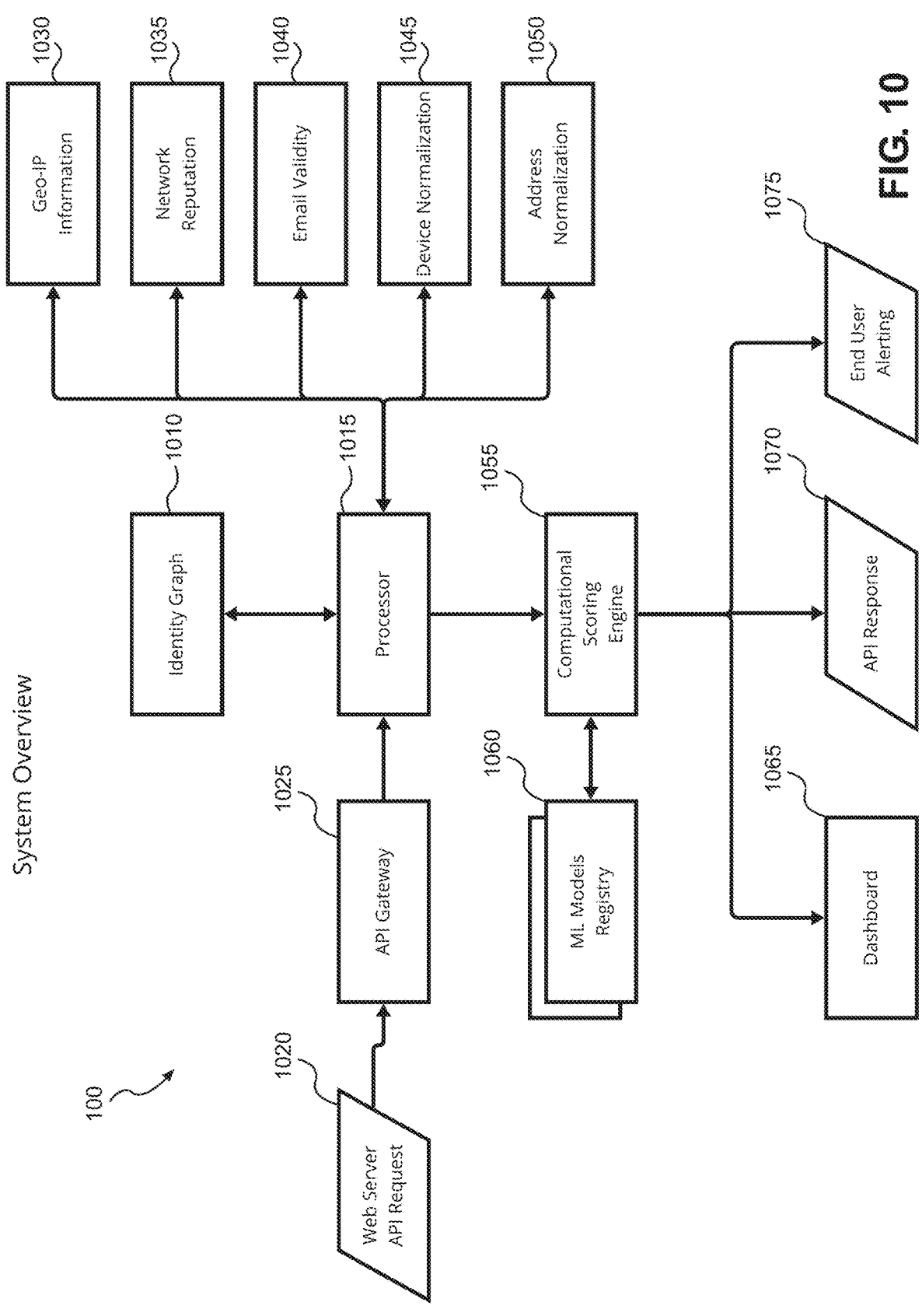
FIG. 10 is a block diagram showing an example system overview of the identity risk determination system.

FIG. 10 is a block diagram showing an example system overview of the identity risk determination system. When a web server API request 1020 is received by an API gateway 1025, a processor 1015 reads and modifies an identity graph 1010 based on geographic and IP information 1030, network reputation 1035, email validity 1040, device normalization 1045, and address normalization 1050. A computational scoring engine 1055 running on the processor 1015 then references machine learning models registry 1060 and yields any of three different output types: a change to a dashboard 1065, an API response 1070, and/or an end-user alert 1075.

Figure 11:
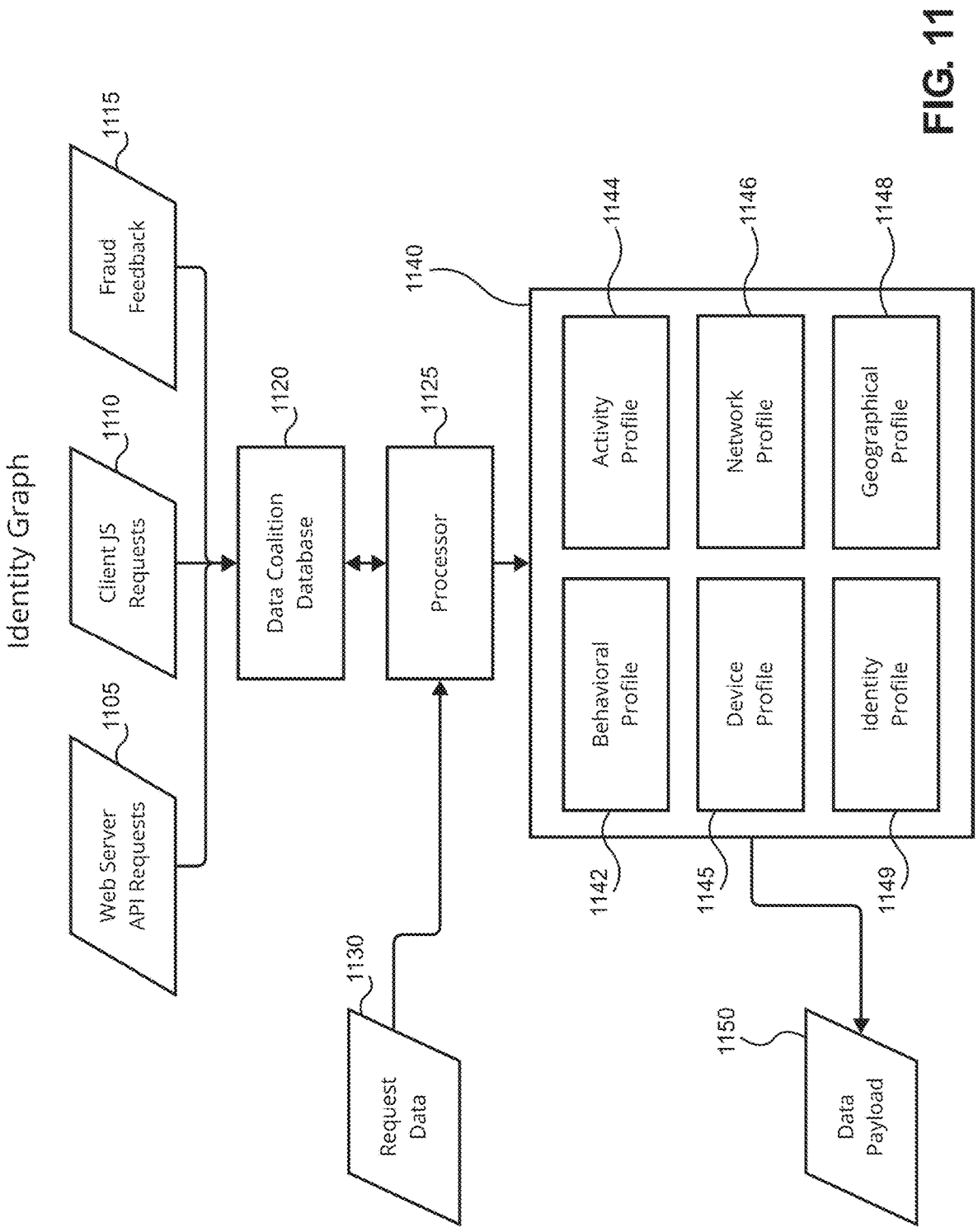
FIG. 11 is a block diagram showing interaction with an identity graph by a processor receiving a data request.

When the identity risk determination system receives a request, it determines the risk associated with that online interaction. It communicates with a collection of historical and longitudinal data, observed across a data coalition and assembled with identity linkages in an identity graph 1010. The system is able to make a determination using a non-exhaustive combination of some of the following attributes:

Email
Name
Physical Address
Billing Address
Shipping Address
Phone
Purchase Amount The system communicates with a collection of local microservices, which may be referred to as data modules such as data modules that handle geographic and IP information 1030, network reputation 1035, network reputation 1040, device normalization 1045, and address normalization 1050. In an example, data modules can be individually added, removed, and configured based on a client's requirements. The computational scoring engine is capable of:

Deploying on or multiple generalized or configurable scoring models
Calculating machine learning classifiers in real-time
Client based configuration
Rule based outputs
Returning numerical, categorical, or action-based outputs FIG. 11 is a block diagram showing interaction with an identity graph 1140 by a processor 1125 receiving a data request 1130. The processor 1125 communicates with a data coalition database 1120 which receives information such as web server API requests 1105, client JavaScript requests 1110, and fraud feedback 1115. The identity graph 1140 may include combinations of six different profiles (e.g., at least two profiles, at least three profiles) selected from a behavioral profile 1142, an activity profile 1144, a device profile 1145, a network profile 1146, an identity profile 1149, and a geographical profile 1148.

The identity graph 1140 aggregates, processes, and returns longitudinal information about the observations and relationships between different data types, and can be queried by one or multiple elements of:

Emails
Aliases or Usernames
IPs
Devices
Addresses
Phone numbers

While mapping data into the behavioral, activity, device, network, geographical, and identity profiles.

The behavioral profile 1142 identifies user anomalous behavior in real-time based on calculating normal and expected behavior across the population and determining anomalies across one or more Emails, Aliases, Usernames, IPs, Devices, Addresses, or Phone Numbers. The activity profile 1144 identifies the consistency and frequency of activity for a particular user, identifying expected online and offline periods for an individual, determining whether the profile is human or bot based on expected and normal behavior of online and offline behavior, and/or aging and transforming observed activity based on a user's current location. The device profile 1145 identifies expected device types, projecting expected version and browser updates, brand affinity, identifying unexpected downgrades or fraudulent devices. The network profile 1146 identifies expected IPs, ISPs, ASNs, and companies, and/or builds VPN affinity on an individualized basis. Geographical profile 1148 can establish geographical centroids based on observed online activity, identifies travel versus permanent movement based on aging, frequency, and consistency of travel, identifies bots, scripts, and synthetic identities based on impossible patterns of travel, and classifies users as residents, travelers, or commuters based on their geographical patterns of behavior. The identity profile 1149 can map and build relationships for Email, Phone and Address, assigning scores to whether data changes are likely to be the same user.

Data is aggregated from the data coalition 1120 database which can include web server API requests 1105, client JavaScript requests 1110 (e.g., loaded on page), and fraud feedback 1115 from customers. The system is capable of returning collections of data for a period of time, linkages and counts from one data type to other data types, frequency, first, last seens for the purpose of establishing behavioral patterns, running computational algorithms, such as those described for profiles above, and incidence of fraud observations across one or multiple dimensions.

Figure 12:
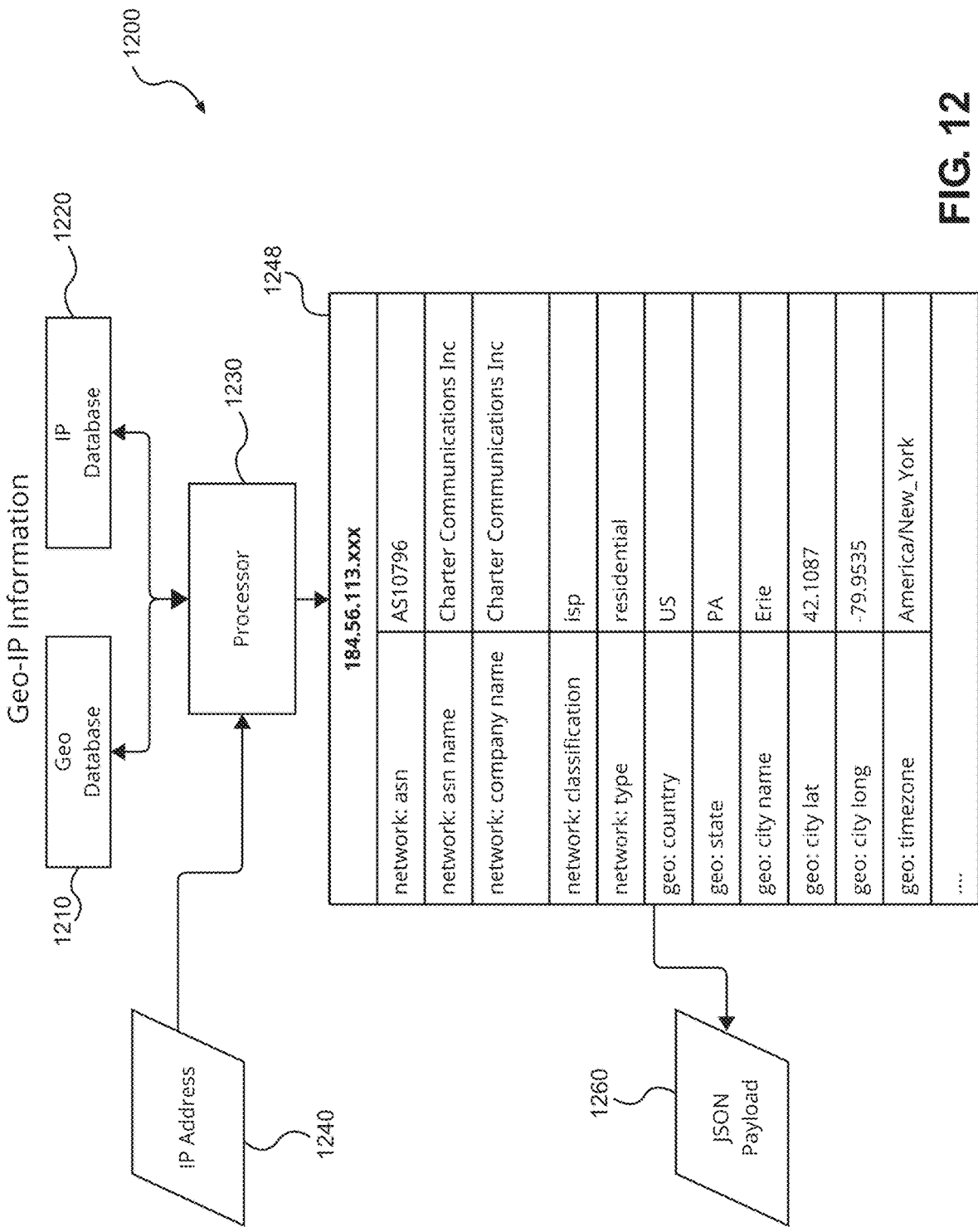
FIG. 12 is a block diagram showing a geographic and IP address information module.

FIG. 12 is a block diagram showing a geographic and IP address information module 1200. A processor 1230 that receives an IP address 1240 for a user action is in communication with a geographical database 1210 and an IP database 1220, and produces an IP/geographic record, such as a geographical profile, that can be communicated outside the system via a JSON payload 1260.

The geo-IP information data module is a computation service which retrieves data from multiple local databases to assemble a collection of information based on an individual IP. Geographical database 1210 can contain all information pertinent to the location of a particular IP. The collection of information may include, but is not limited to, country, state, city name, city latitude/longitude, time zone, etc.

The IP database 1220 can contain all information pertinent to the network characteristics of a particular IP address. The collection of information may include but is not limited to:

ASN Number
ASN Name
Company Name
Classification—one of ISP, LAN, etc.
Type—one of residential, corporate, hosting, educational, etc.

The module returns this data in a JSON payload for downstream processing.

Figure 13:
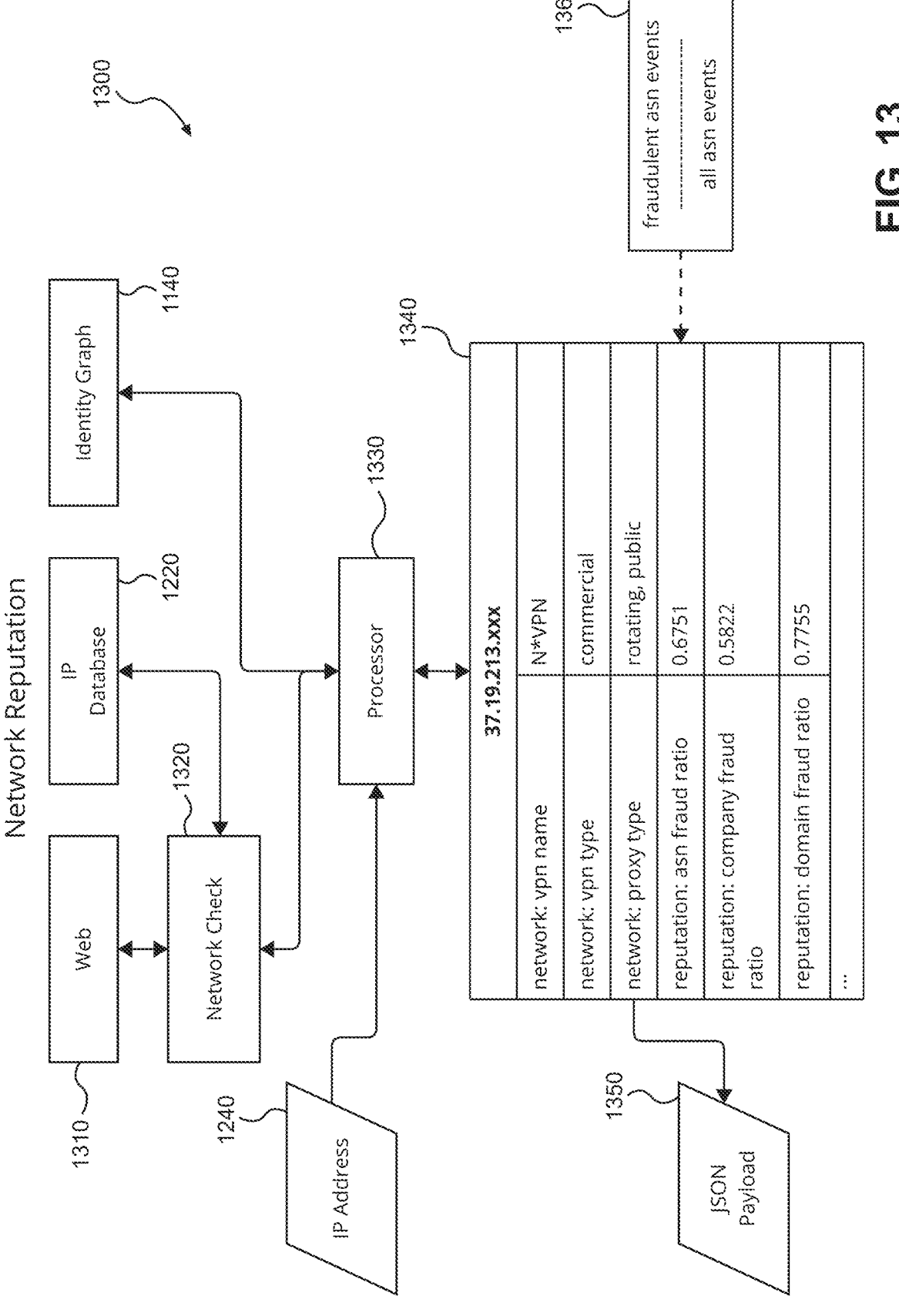
FIG. 13 is a block diagram showing a network reputation information module.

FIG. 13 is a block diagram showing a network reputation information module 1300. A processor 1330 receiving an IP address 1240 associated with a user action is in communication with the identity graph 1140, and also performs a proxy check 1320 of traffic from the web 1310 using the IP database 1220. The processor 1330 can also generate a network record 1340 that includes a ratio 1360 of fraudulent ASN events to total ASN events based on observed activity. Similarly, this reputational data is created for the observed IP-derived company and domain. This information can then be communicated via a JSON payload 1350.

The network reputation data module is a computation service which uses an IP address 1240 to communicate with the network check service which retrieves IP information from an IP database 1220 of known proxies and VPNs. The module then determines the name and type of VPN being used, continuously collects information across the web for suspected proxies, continuously tests IP addresses for the existence of VPN or proxy services, communicates with the identity graph 1140 to retrieve information about historically successful, failed, and fraudulent actions for a particular IP address, and assembles this information into fraud ratios (e.g., ASN event fraud ratio 1360). The module then assembles the information into a collection of information which may include but is not limited to:

VPN Name
VPN Type
Proxy Type
Fraud Ratio—ASN
Fraud Ratio—Company
Fraud Ratio—Domain The module then returns this data in a JSON payload 1350 for downstream processing.

Figure 14:
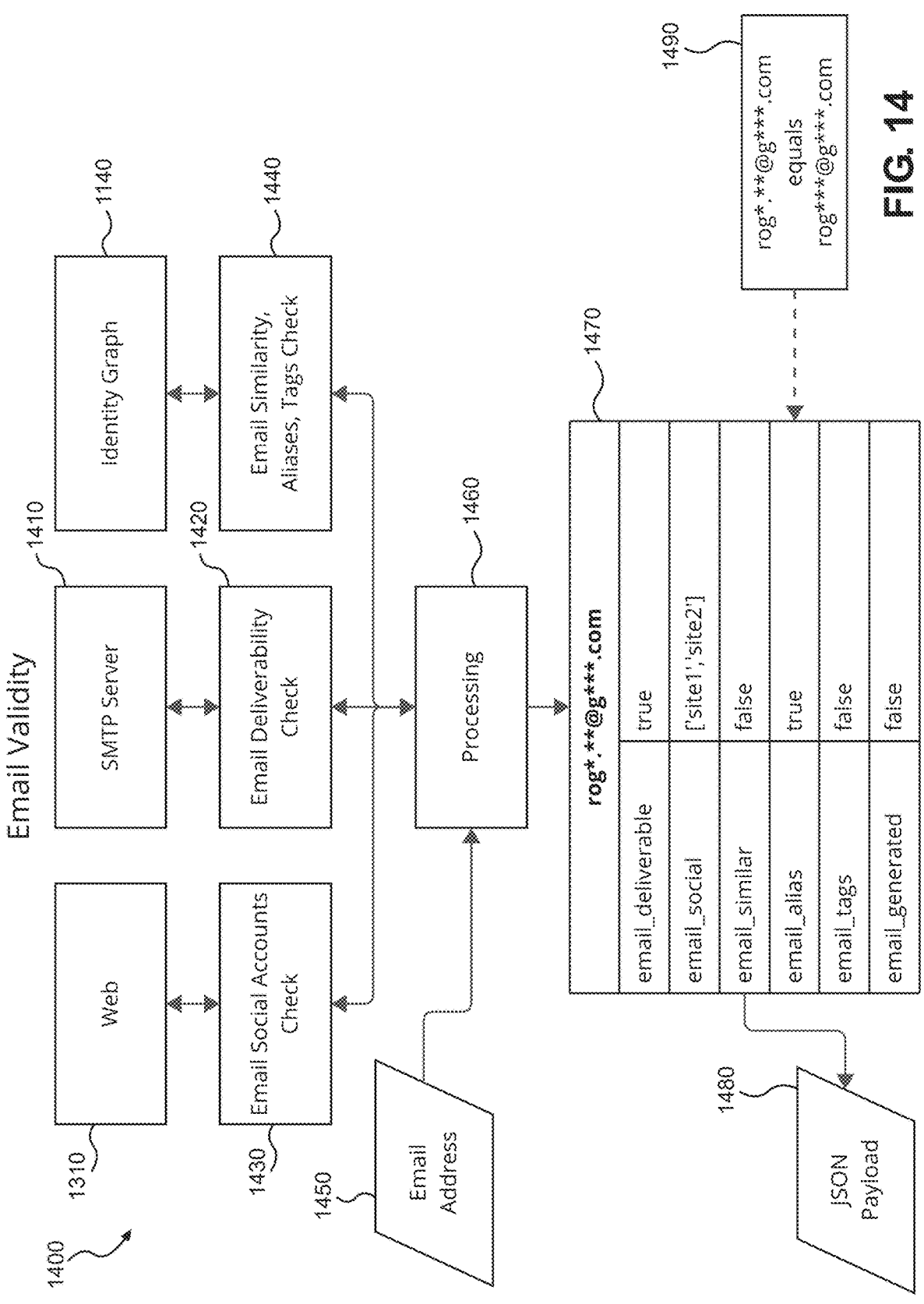
FIG. 14 is a block diagram showing an email validity module.

FIG. 14 is a block diagram showing an email validity module 1400. A processor 1460 receives an email address 1450 associated with a user action. The processor performs an email deliverability check 1430 via the web 1310, an email social accounts check 1420 via an SMTP server 1410 associated with the email address 1450, and an email similarity, aliases, and tags check 1440 via the identity graph 1140. An example similarity check is shown in element 1490. The processor 1460 then returns an email record 1470 that can be delivered as a JSON payload 1480.

The email validity data module is a computation service which uses an email address to continuously check the validity and deliverability of email addresses in the identity graph 1140. The module communicates externally to the web to complete an email social accounts check, where any pertinent data about the observance of an email on a particular service creates linkages and is written to the identity graph. The module tests the validity of the email address by completing an email deliverability check. This service communicates with the SMTP server to determine if the email exists. The module also communicates with the identity graph to retrieve historical information about the activity of known aliases, similar emails, and programmatically generated email addresses, and assembles the information into a collection of information where other sources of information such as those reported by tools such as AVR or Darkweb are utilized, which may include but is not limited to:

Email Deliverable
Email social observations
Email similarity
Email alias (see element 1490)
Email tags used
Email generated The module then returns this data in a JSON payload 1480 for downstream processing.

Figure 15:
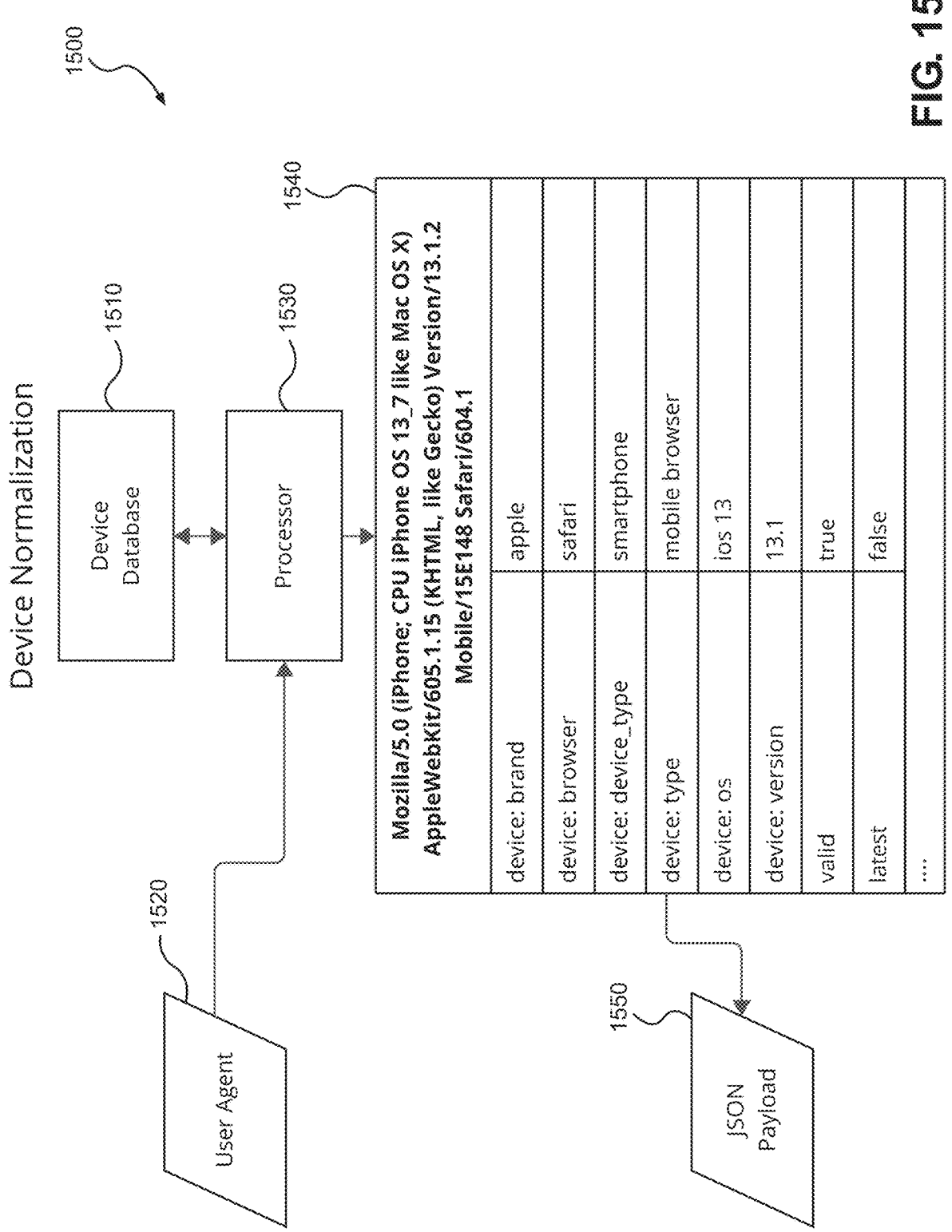
FIG. 15 is a block diagram showing a device normalization module.

FIG. 15 is a block diagram showing a device normalization module 1500. The Device Normalization Data Module is a computation service which uses a user agent 1520 executing on a processor 1530 to communicate with an authoritative device database 1510 of known and valid user agents and mobile app profiles, and verifies the validity of a device string or user agent. It then normalizes the data into a device record 1540 which may include but is not limited to:

Device brand
Device browser type
Device type (modality)
Device type (application)
Device OS
Device version
Validity
Updated/latest The module then returns this data in a JSON payload 1550 for downstream processing.

FIG. 16 is a block diagram showing an address normalization data module 1600. Address normalization data module 1600 can be a computation service that is executed on a processor 1620 and uses a physical address 1630 associated with a user action to communicate with an authoritative address database 1610 of known and valid addresses to verify the validity and deliverability of the physical address 1630. Address normalization data module 1600 might use fuzzy matching to normalize the data into and address record 1640 which may include but is not limited to:

Address number
Address street
Address type
Address direction/quadrant
Address unit
Address city
Address state
Address zip
Address country
Address validity The module then returns this data in a JSON payload 1650 for downstream processing.

Figure 17:
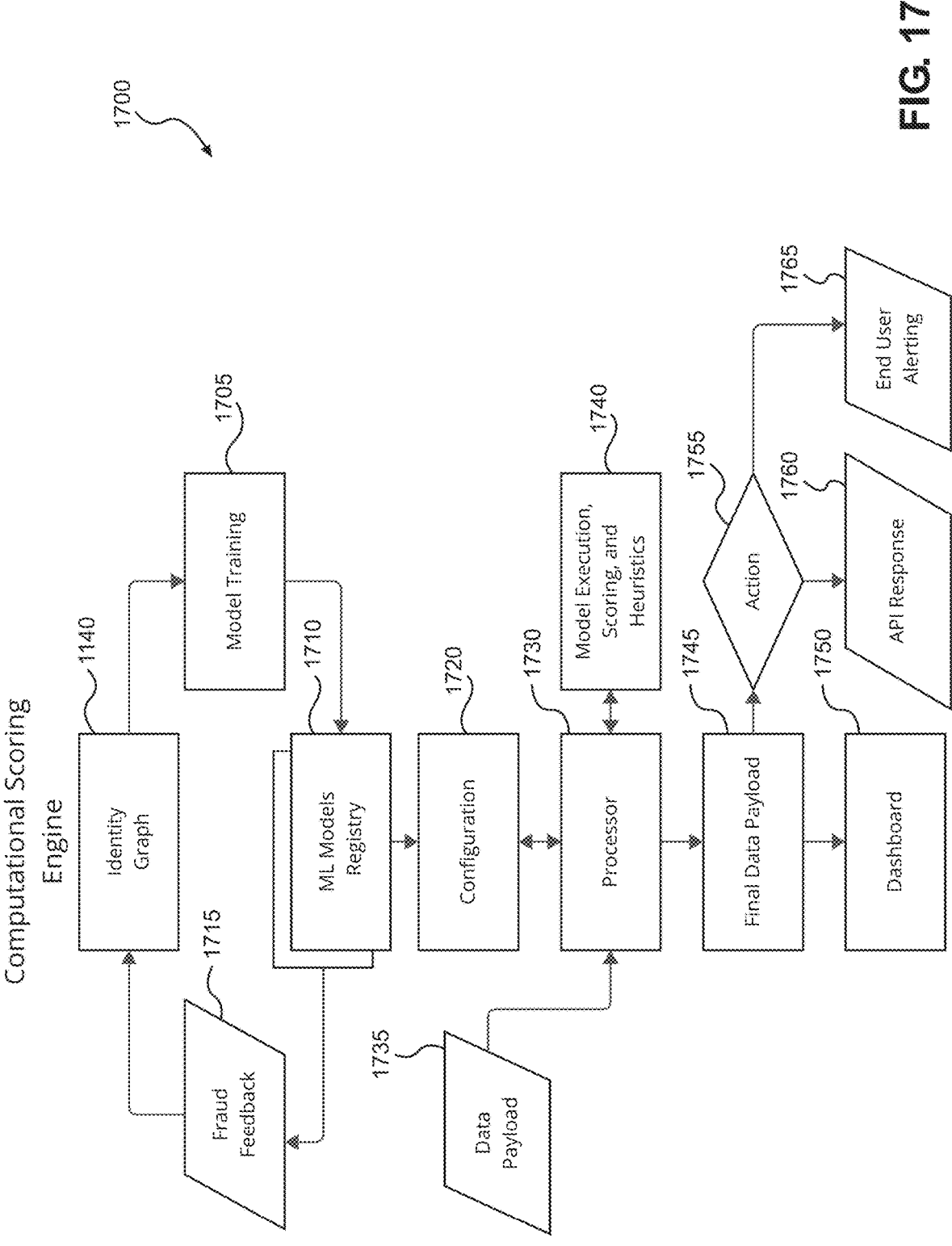
FIG. 17 is a block diagram showing an example computational scoring engine.

FIG. 17 is a block diagram showing an example computational scoring engine 1700. A processor 1730 receives a data payload 1735 associated with a user action and a configuration file 1720 delivered by a machine learning (ML) models registry 1710. ML models registry 1710 receives model training 1705 based on changes in the identity graph 1140 from fraud feedback 1715. The processor calls an ML model execution, scoring, and heuristics module 1740, and constructs a final data payload 1745 that can be shown on a dashboard 1750 or executed as an action 1755 that generates either or both of an API response 1760 and an end user alert 1765.

The core components of the computational scoring engine 1700 can include the ML models registry 1710, which is a collection of models created for customers based on fraud feedback 1715 and proprietary data from the identity graph 1140. The configuration file 1720 may for example be a flexible, client-based configuration, instructing the processor which models to use, how to treat and assemble the output data, and what actions 1755 to take, if any.

The model execution, scoring and heuristics module 1740 is an engine to apply additional transformations onto the model output (e.g., enhancing the significance of a particular risk vector, application of real-time risk factors provided as fraud feedback or from API Requests, or constructing data for a specific API or output).

Figure 18:
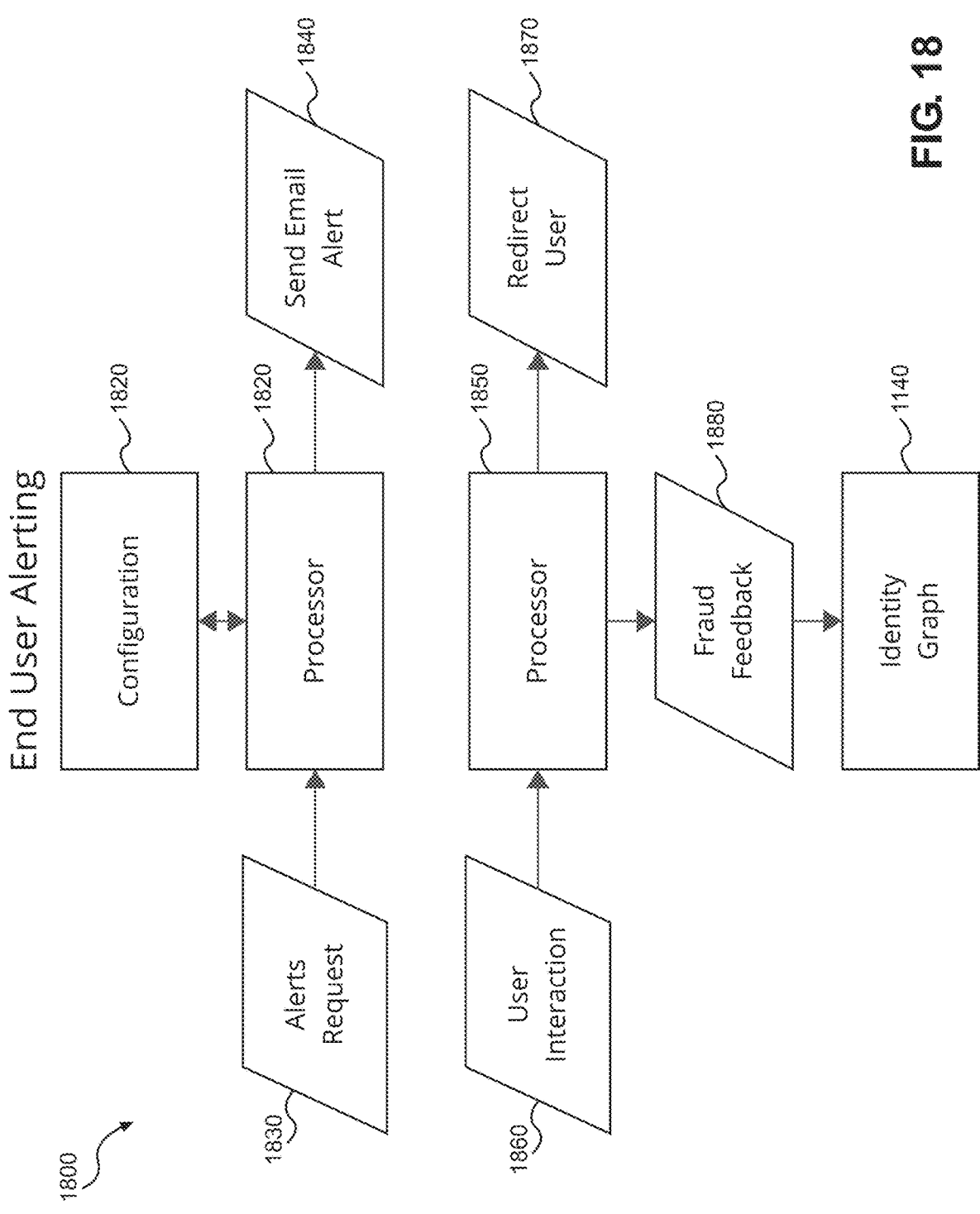
FIG. 18 is a block diagram of an example end user alerting module.

FIG. 18 is a block diagram of an example end user alerting module 1800. A processor 1810 receives an alert request 1830 and a configuration 1820, and sends an email alert 1840 to the user. The same or a different processor 1850 receives a user interaction 1860 and generates a user redirect (handled by a user redirection service 1870) and fraud feedback 1880 that is entered into identity graph 1140.

The end user alerting module may for example be a configuration-based service, capable of assembling and sending email messages with customized header information, content, dynamic text, and/or URL redirection, over one or multiple online services. When a user clicks a link, user redirection service 1870 can collect feedback data collected in identity graph 1140.

The logical operations making up the embodiments of the technology described herein are referred to variously as operations, steps, objects, elements, components, or modules. Furthermore, it should be understood that these may occur or be performed in any order, unless explicitly claimed otherwise or a specific order is inherently necessitated by the claim language.

All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the identity risk determination system. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." The word "comprising" does not exclude other elements or steps, and the indefinite article "a" or "an" does not exclude a plurality. Unless otherwise noted in the claims, stated values shall be interpreted as illustrative only and shall not be taken to be limiting.

The above specification, examples and data provide a complete description of the structure and use of exemplary embodiments of the identity risk determination system as defined in the claims. Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter.

Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for detecting potentially fraudulent activity occurring over a networked computer system, the method comprising:

a) providing a plurality of data objects, wherein a given data object of the plurality of data objects includes condition fields representing a plurality of conditions associated with the given data object;

b) acquiring first data, from a plurality of online service provider systems;

c) storing the first data within at least some data objects of the plurality of data objects, wherein the first data includes data relating to a plurality of interactions of a user with the plurality of online service provider systems;

d) acquiring second data, from the plurality of online service provider systems;

e) storing the second data within at least some data objects of the plurality of data objects, wherein the second data includes data relating to a second plurality of interactions of a plurality of other users other than the user;

f) generating, based on the first data or the second data, at least three profiles selected from a behavioral profile, an activity profile, a device profile, a network profile, a geographical profile, and an identity profile of the user;

g) generating, based on the at least three profiles, a user identity graph;

h) receiving, from a client system, an application programming interface (API) request, wherein the API request includes information about the user and a new user interaction record associated with an interaction attempt of the user;

i) identifying matches between (1) the generated user identity graph and/or the information about the user from the API request and (2) the condition fields;

j) adding, based on the identified matches, match fields to the given data object to form a populated data object, wherein at least one match field includes data relating to the identified matches;

k) based on a plurality of populated data objects comprising the populated data object, determining (1) at least one trust signal response, (2) at least one information signal response, (3) at least one risk signal response, and (4) an identity risk score; and l) generating an API response, for sending to the client system in response to the new user interaction record, wherein the API response comprises a first representation of the identity risk score and a second representation of at least one of (1) the at least one trust signal response, (2) the at least one information signal response, and/or (3) the at least one risk signal response.

2. The computer-implemented method of claim 1, further comprising:

l) Determining whether the identity risk score meets a predetermined criterion;

m) following a determination that the identity risk score meets the predetermined criterion:

1) Generating a fraud check alert;

2) Sending the fraud check alert to the client system;

3) Receiving, from the client system, a fraud check response wherein the fraud check response indicates an indication from the user of whether a new user interaction represented by the new user interaction record was indeed attempted by the user; and 4) If the fraud check response indicates that the new user interaction was attempted by the user, denote the new user interaction as a legitimate user interaction; and 5) If the fraud check response indicates that the new user interaction was not attempted by the user, denote the new user interaction as an illegitimate user interaction and sending a fraud alert report to the client system.

3. The computer-implemented method of claim 2, further comprising:

6) Based on whether the new user interaction was attempted by the user, updating at least some data objects of the plurality of data objects.

4. The computer-implemented method of claim 1, further comprising performing steps i) and j) for each data object of the plurality of data objects, wherein the plurality of populated data objects comprise each data object having been populated in step j).

5. The computer-implemented method of claim 1, wherein the identity risk score comprises a numerical value.

6. The computer-implemented method of claim 5, wherein the numerical value ranges from 0, indicating a first indication, to 1, indicating a second indication, wherein the first indication represents a first level of trust greater than a second level of trust corresponding to the second indication.

7. The computer-implemented method of claim 1, wherein the identity risk score comprises an enumerated value selected from an enumerated list of {"TRUSTED", "NO_RISK", "LOW_RISK", "MEDIUM_RISK", "HIGH_RISK"}.

8. The computer-implemented method of claim 1, wherein the given data object is an e-mail activity response object associated with an e-mail address, and wherein the condition fields comprise at least one of (1) a date when the e-mail address was last seen, (2) a number of times the e-mail address has been seen, and/or (3) a number of IP addresses associated with the e-mail address.

9. The computer-implemented method of claim 1, wherein the given data object is an IP activity response object associated with an IP address, and wherein the condition fields comprise at least one of (1) a date when the IP address was last seen, (2) a number of times the IP address has been seen, and/or (3) a number of e-mail addresses associated with the IP address.

10. The computer-implemented method of claim 1, wherein the given data object is an e-mail/IP response object associated with an e-mail address and an IP address, and wherein the condition fields comprise at least one of (1) an indication of whether the e-mail address and the IP address have been seen together before, (2) a date when the e-mail address and the IP address were last seen together, (3) a number of times the e-mail address and the IP address have been seen together, or (4) a ranking of the IP address against the e-mail address.

11. The computer-implemented method of claim 1, wherein the given data object is a geographic response object associated with a geographic location of the user, and wherein the condition fields comprise at least one of (1) a detected jurisdiction within which a presence of the user is detected, and/or (2) detected geographic coordinates at which the presence of the user is detected.

12. The computer-implemented method of claim 1, wherein the given data object is a network response object associated with a network of the user, and wherein the condition fields comprise at least one of (1) an ASN of an Internet Service Provider (ISP) that owns or controls systems that handle traffic for a user IP address of the user, (2) a name of the ISP, (3) a company registered to the user IP address, (4) a name of a virtual private network (VPN) service of the user, (5) a name of a crawler associated with the user IP address, and/or (6) an IP address characteristic indication the user IP address, wherein the IP address characteristic indication indicates one or more of (1) whether the user IP address is confirmed to be associated with a VPN, (2) whether the user IP address is suspected of being associated with a VPN, (3) whether the user IP address is capable of being used with a VPN, and/or (4) whether the user IP address is known to be associated with a The onion router (Tor) network, a hosted network, a corporate network, a .edu network, a mobile network, and/or a proxy.

13. The computer-implemented method of claim 1, wherein the at least one trust signal response comprises at least one of a null indicator, a first indicator indicating that an e-mail address and IP address of the user are a match, a second indicator indicating that the IP address is familiar from past interactions with the user, a third indicator indicating that a network carrier of the user is familiar from past interactions with user, a fourth indicator indicating that a VPN is familiar from previous interactions, a fifth indicator indicating that a device of the user is familiar from past interactions with the user, a sixth indicator indicating that a country of the user is familiar from past interactions with the user, a seventh indicator indicating that a state of the user is familiar from past interactions with the user, an eighth indicator indicating that a city of the user is familiar from past interactions with the user, an ninth indicator indicating that a time zone of the user is familiar from past interactions with the user, a tenth indicator indicating that a time of day of a new user interaction is familiar from past interactions with the user, an eleventh indicator indicating that the user is interacting from a most common home location of the user, a twelfth indicator indicating that an entered address is within a threshold distance of a previously observed activity for a user, a thirteenth indicator indicating that two entered addresses are within the threshold distance of one another, a fourteenth indicator indicating that the activity observed for the user resembles a real human pattern.

14. The computer-implemented method of claim 1, wherein the at least one information signal response comprises at least one of a null indicator, a first indicator that infrequent activity has been observed for a user, a second indicator indicating that a device of the user is a mobile device, a third indicator indicating that the user is on a mobile network, a fourth indicator indicating that a user is on a corporate network, a fifth indicator indicating that the user is on an educational network, a sixth indicator indicating that the user is on a non-US network, a seventh indicator indicating that the user is on a commercial VPN, an eighth indicator indicating that the user has upgraded their device or app, an eighth indicator indicating that an IP address of the user has been seen fewer than a threshold number of times, a ninth indicator indicating that a network of the user has been seen less than a threshold number of times, a tenth indicator indicating that the device of the user has been seen less than a threshold number of times, an eleventh indicator indicating that a country of the user has been seen less than a threshold number of times, a twelfth indicator indicating that a state of the user has been seen less than a threshold number of times, a thirteenth indicator indicating that a city of the user has been seen less than a threshold number of times, a fourteenth indicator indicating that a time zone of the user has been seen less than a threshold number of times, a fifteenth indicator indicating that activity observed for the user has a stable activity pattern, a sixteenth indicator indicating that the activity observed for the user resembles that of a frequent traveler.

15. The computer-implemented method of claim 1, wherein the at least one risk signal response comprises at least one of a null indicator, a first indicator indicating that an IP address of the user is new to the user, a second indicator indicating that a network of the user is new to the user, a third indicator indicating that a VPN of the user is new to the user, a fourth indicator indicating that a device of the user is new to the user, a fifth indicator indicating that a country of the user is new to the user, a sixth indicator indicating that a city of the user is new to the user, a seventh indicator indicating that a region of the user is new to the user, an eighth indicator indicating that the user is interacting from an unfamiliar time of day, a ninth indicator indicating that an age of an account of the user is less than a predetermined age, a tenth indicator indicating that an entered address is above a distance threshold of observed activity for a user, an eleventh indicator indicating that a distance between two entered addresses is above a distance threshold, a twelfth indicator indicating that the user is connecting through a rotating proxy, a thirteenth indicator indicating that the user is connecting through a public proxy, a fourteenth indicator indicating that the user is connecting through a hosted environment, a fifteenth indicator indicating that the user is a connecting through a The onion router (Tor) exit node, a sixteenth indicator indicating that the user is connecting through a private VPN, a seventeenth indicator indicating that the user is on a suspicious ISP, an eighteenth indicator indicating that the user has been detected to be a bot or crawler, a nineteenth indicator indicating that malware has been detected on the user's device or network, a twentieth indicator indicating that the user has downgraded their device or app, a twenty-first indicator indicating that it would be impossible for the user to interact from a previous location and a current location in an observed elapsed time, a twenty-second indicator indicating that the activity observed for the user resembles that of a script or bot, a twenty-third indicator indicating that network usage has been identified as anomalous, a twenty-fourth indicator indicating that a device usage has been identified as anomalous, a twenty-fifth indicator indicating that the user's city or state has been associated with recent anomalous activity, a twenty-sixth indicator indicating that a device of the user cycles over multiple accounts, a twenty-seventh indicator indicating that an account of the user cycles over multiple devices, a twenty-eighth indicator indicating that the account of the user cycles over multiple IPs, a twenty-ninth indicator indicating that the account of the user cycles over multiple addresses, thirtieth indicator indicating that an IP address of the user cycles over multiple emails or physical addresses, a thirty-first indicator indicating that the IP address has a spike of failed activity, a thirty-second indicator indicating that the account has a spike of failed activity, a thirty-third indicator indicating that the IP address has recently observed malicious activity, a thirty-fourth indicator indicating that a usage pattern of the device of the user has been identified as anomalous, a thirty-fifth indicator indicating an email tag or alias cycling, a thirty-sixth indicator indicating an invalid or undeliverable email address, a thirty-seventh indicator indicating a disposable email address, a thirty-eight indicator indicating a disposable domain, a thirty-ninth indicator indicating suspicious email formatting, a fortieth indicator indicating an invalid device, a forty-first indicator indicating an invalid address.

16. The computer-implemented method of claim 1, wherein the new user interaction record comprises one or more of (1) a login attempt, (2) an authentication attempt, (3) a user profile data change attempt, (4) an account detail change attempt, (5) a payments method change attempt, and/or (6) a checkout action.

17. The computer-implemented method of claim 1, further comprising:

compiling a list of bad actors from the plurality of online service provider systems;

comparing the information against the list of bad actors; and if the comparing indicates the user is on the list of bad actors, sending a report to the client system.

18. The computer-implemented method of claim 1, further comprising:

providing a honeypot e-mail address;

receiving an e-mail message at the honeypot e-mail address; and adding a sender of the e-mail message to a list of bad actors.

19. The computer-implemented method of claim 1, further comprising:

applying one or multiple models from a machine learning (ML) registry to the second data to compute the identity risk score.

20. The computer-implemented method of claim 1, further comprising:

modifying or transforming the API response on a per-client basis or per-API-request basis, for a particular input and website, with a weighting of the identity risk score.

21. The computer-implemented method of claim 1, further comprising:

modifying or transforming the API response in real time using feedback data based on the API request.

22. A computer system comprising:

one or more processors; and a storage medium storing instructions, which when executed by the one or more processors, cause the computer system to implement the method of claim 1.

23. A non-transitory computer-readable storage medium storing instructions, which when executed by at least one processor of a computer system, causes the computer system to carry out the method of claim 1.

* * * * *